United States Patent [19]

Takahashi et al.

[11] Patent Number: 5,671,060
[45] Date of Patent: Sep. 23, 1997

[54] METHOD OF ESTIMATING SPECTRAL DISTRIBUTION OF FILM AND METHOD OF DETERMINING EXPOSURE AMOUNT

[75] Inventors: Koji Takahashi; Takaaki Terashita, both of Kanagawa, Japan

[73] Assignee: Fuji Photo Film Co., Ltd., Kanagawa, Japan

[21] Appl. No.: 336,071

[22] Filed: Nov. 4, 1994

Related U.S. Application Data

[63] Continuation of Ser. No. 862,505, Apr. 2, 1992, abandoned.

[30]  Foreign Application Priority Data

| Apr. 10, 1991 | [JP] | Japan | 3-077818 |
| Apr. 10, 1991 | [JP] | Japan | 3-077819 |
| Apr. 10, 1991 | [JP] | Japan | 3-077871 |

[51] Int. Cl.$^6$ .................................................. G01N 21/25
[52] U.S. Cl. ......................................................... 356/405
[58] Field of Search ...................................... 356/402–411

[56] References Cited

U.S. PATENT DOCUMENTS 4,267,572  5/1981  Witte ........................... 356/325 X

FOREIGN PATENT DOCUMENTS

| 3737075 A1 | 7/1988 | Germany . |
| 3802681 A1 | 8/1988 | Germany . |
| 3737775 A1 | 5/1989 | Germany . |
| 3938841 A1 | 8/1990 | Germany . |
| 58-88624 | 5/1983 | Japan . |
| 61-95525 | 5/1986 | Japan . |
| 1134353 | 5/1989 | Japan . |
| 1142719 | 6/1989 | Japan . |

OTHER PUBLICATIONS

Ohta, "Estimating Absorption Bands of Component Dyes by Means of Principal Component Analysis" Analytical Chemistry, vol. 45, No. 3, pp. 553–557, Mar. 1973.

Primary Examiner—K. Hantis
Attorney, Agent, or Firm—Sughrue, Mion, Zinn, Macpeak and Seas

[57] ABSTRACT

A plurality of principal-component spectral distributions are determined in advance by analyzing spectral distributions of a multiplicity of sample films; light transmitted through a film to be estimated is measured by spectrally diffracting the transmitted light into wavelengths of different bands or into different wavelength bands the number of the wavelengths or wavelength bands being equivalent to that of the plurality of principal-component spectral distributions; coefficients for expressing the spectral distribution of the film to be estimated as a linear sum of the plurality of principal-component spectral distributions are determined on the basis of photometric values of the respective wavelengths wavelength bands and the plurality of, principal-component spectral distributions; and the spectral distribution of the film to be estimated is estimated by determining the linear sum of the plurality of principal-component spectral distributions by using the coefficients obtained. On the basic of the spectral distribution estimated and by using an effective spectral sensitivity distribution of the copying light-sensitive material, a calculation is made of a transmission density which is equivalent to a transmission density obtained when an image on the film to be printed is photometrically measured by a photometric device having a spectral sensitivity distribution identical to a spectral sensitivity distribution of the copying light-sensitive material; and exposure amount for printing the image on the film to be printed onto the light-sensitive material is determined on the basis of the transmission density calculated.

18 Claims, 14 Drawing Sheets

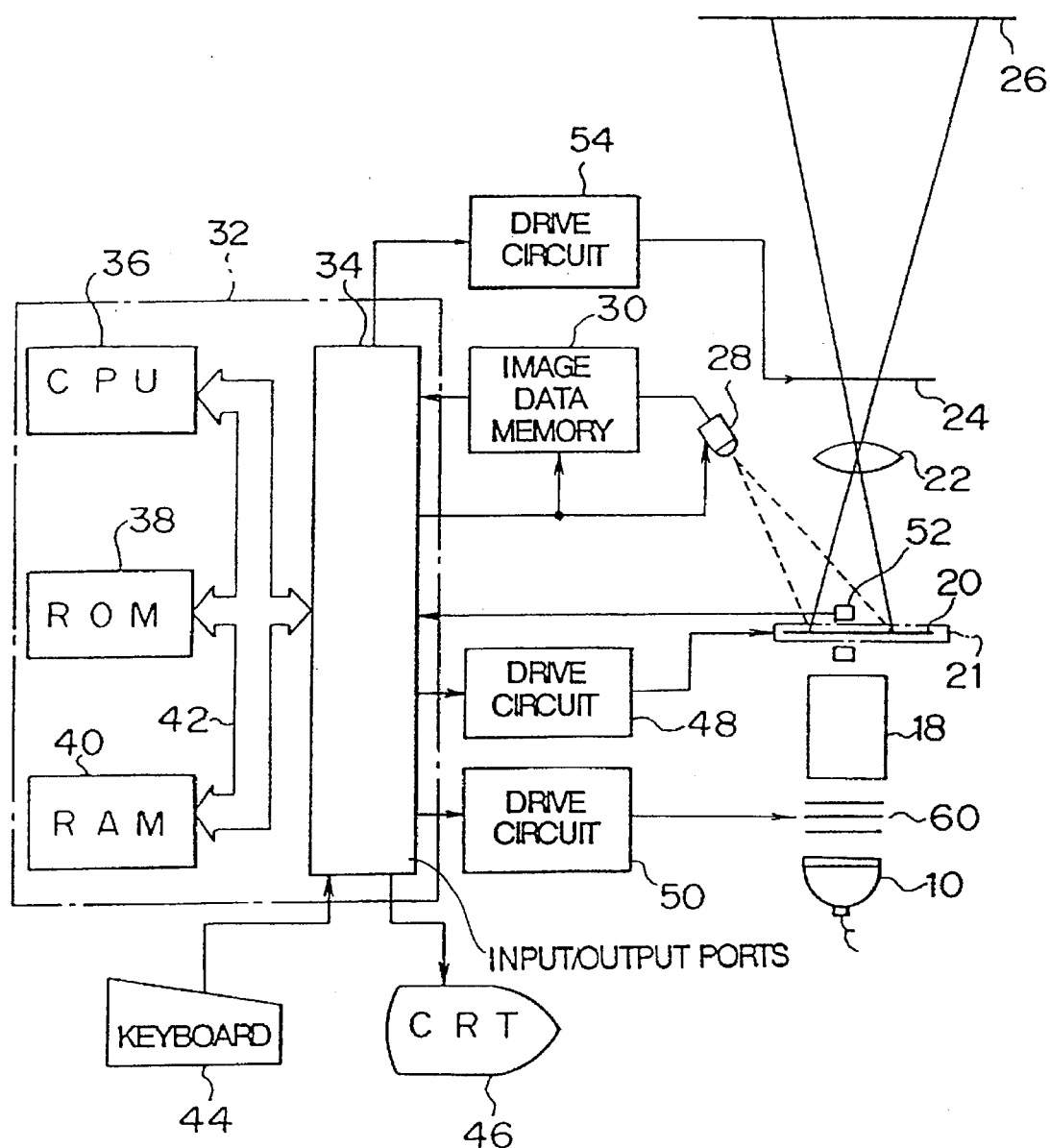

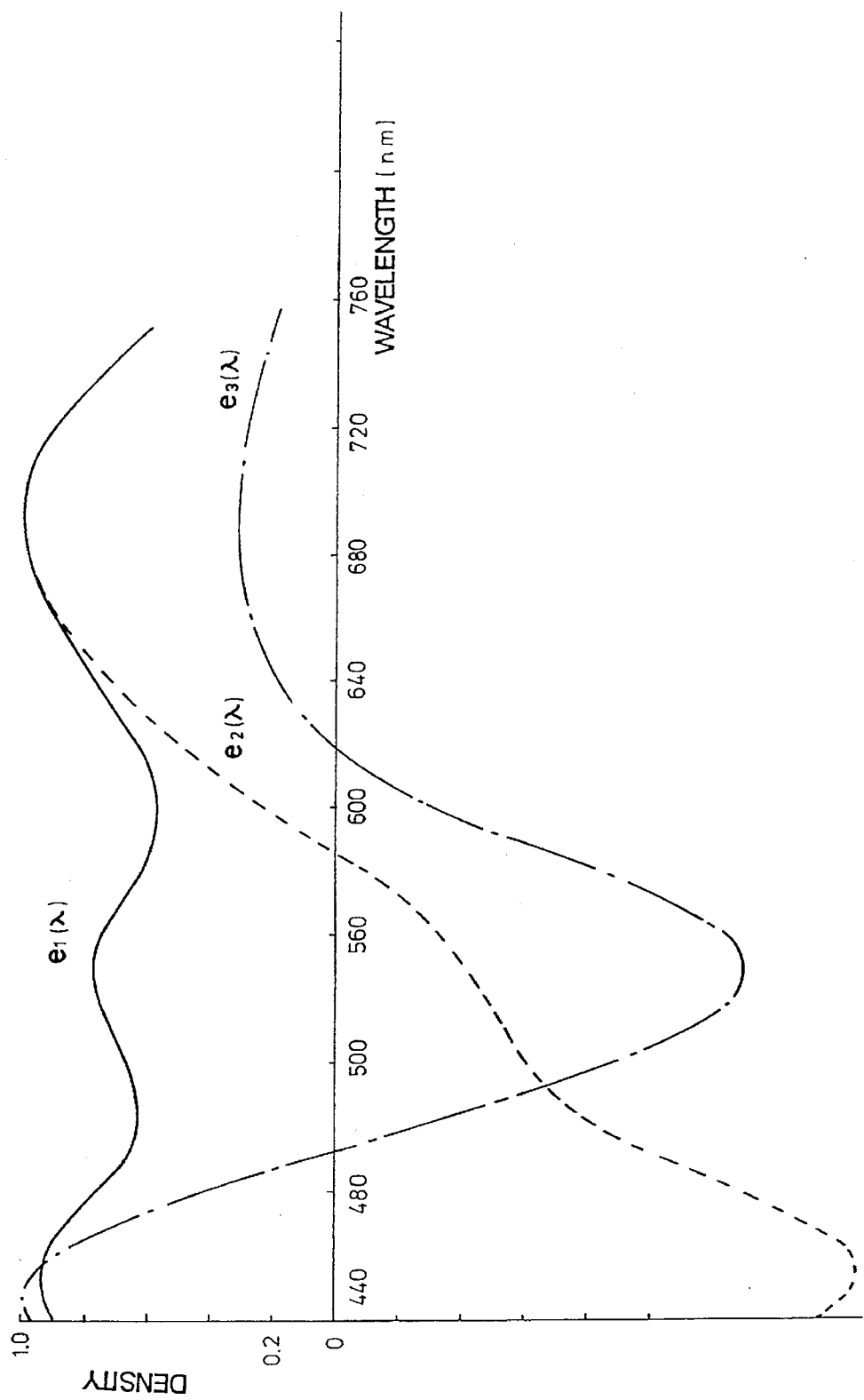

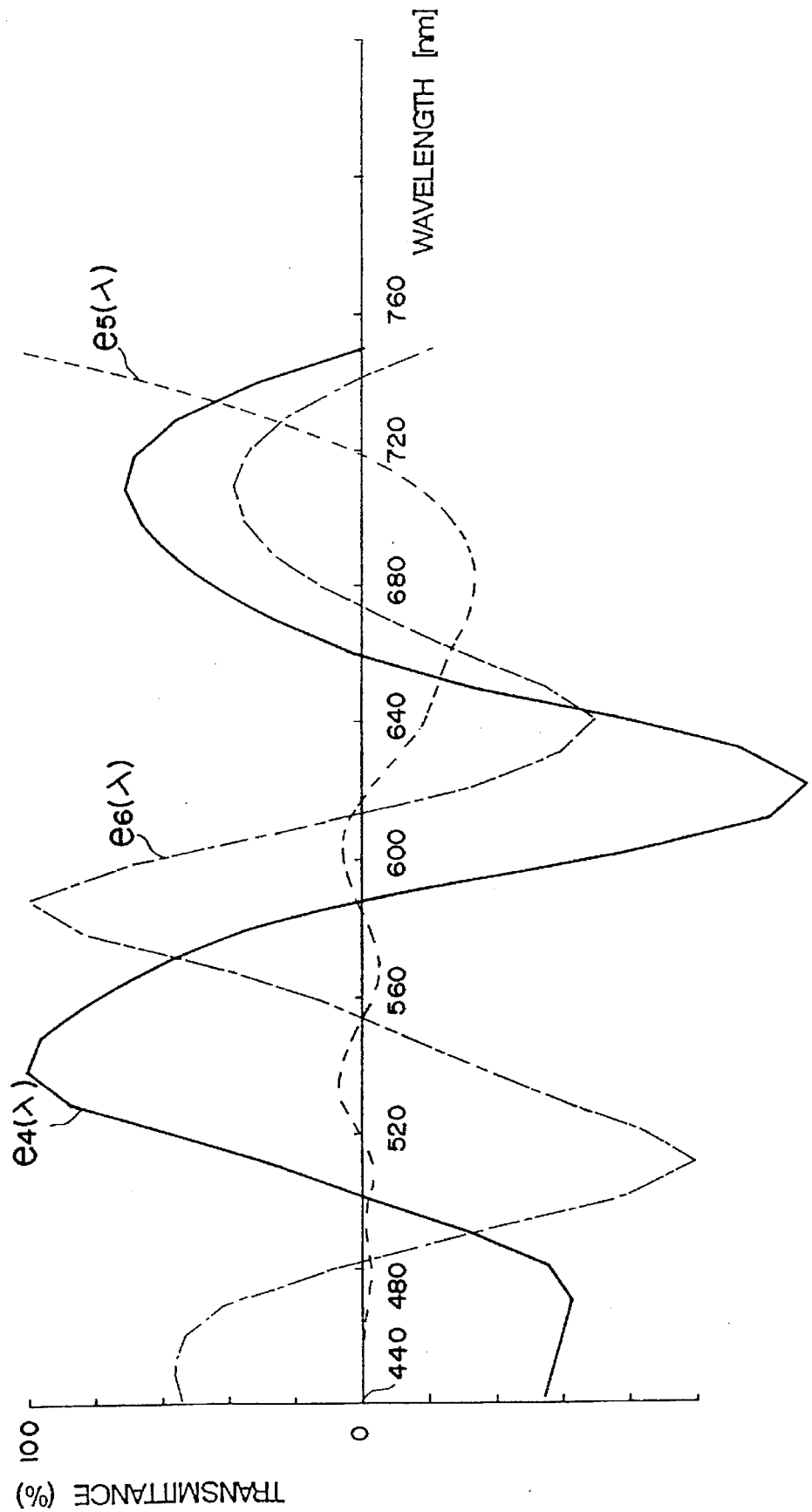

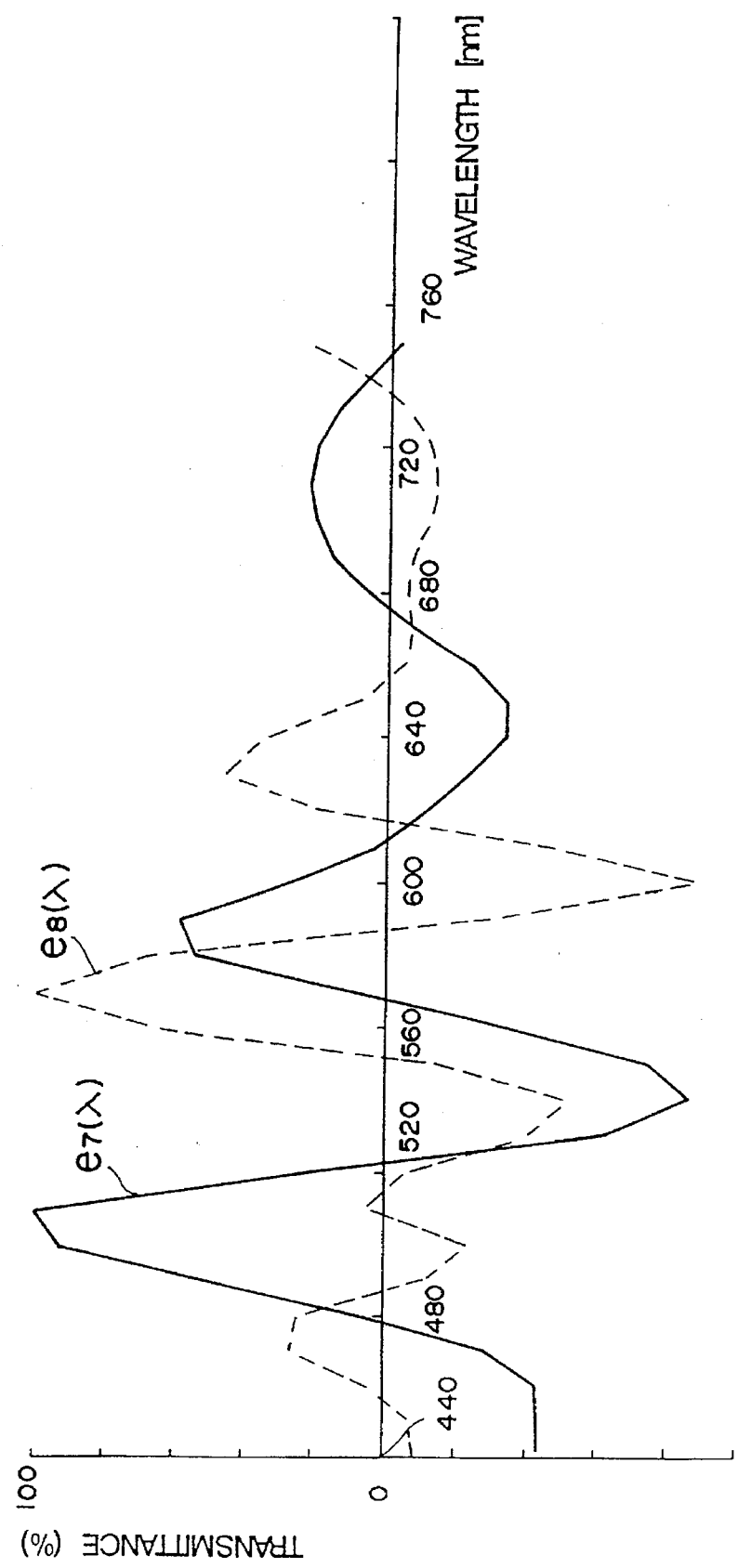

METHOD OF ESTIMATING SPECTRAL DISTRIBUTION OF FILM AND METHOD OF DETERMINING EXPOSURE AMOUNT

This is a continuation of application Ser. No. 07/862,505 filed Apr. 2, 1992, now abandoned.

BACKGROUND OF THE INVENTION

1. Field of the Invention

The present invention relates to a method of estimating a spectral distribution of a film (a negative film or a positive film) and a method of determining exposure amount. More particularly, the present invention concerns a method of estimating a spectral distribution (a spectral transmission strength distribution, a spectral transmittance distribution, a spectral transmission density distribution, or the like) of a film by using principal-component spectral transmittance distributions or principal-component spectral transmission density distributions and a method of determining exposure amount when an image is printed onto a copying light-sensitive material by using the estimated spectral distribution.

2. Description of the Related Art

In general, when a color image is reproduced on a copying light-sensitive material from a color original picture, exposure amount is determined with respect to the respective colors of red (R), green (G), and blue (B) light by measuring integral transmission densities of the R, G, and B light by using a photometric device having color separation filters comprised of dye filters or evaporated filters. In order to determine the exposure amount accurately, it is necessary for the spectral sensitivity distribution of the photometric device to accurately coincide with the spectral sensitivity distribution of the copying light-sensitive material. The spectral sensitivity distribution of this copying light-sensitive material is a complicated distribution which exhibits asymmetry with respect to a wavelength at which sensitivity becomes maximum. For this reason, in preparing the color separation filters by means of the dye filters and evaporated filters, it is necessary to combine a multiplicity of filters, so that it is difficult to mass produce them and also difficult to fabricate them with a high degree of accuracy.

Accordingly, in a photoresist exposure apparatus, a technique is known wherein the spectral sensitivity distribution of a photometric device is made to coincide with the spectral sensitivity distribution of a copying light-sensitive material by separating the light from an original picture into spectral components and by effecting processing by adding weight to the separated components. Japanese Patent Application Laid-Open No. 88624/1983 discloses a technique in which the aforementioned processing is effected by using a photoresist exposure apparatus comprising a diffraction grating, a convergent optical system, and a photodetector. However, a complicated mechanism is required to ensure that the spectral sensitivity characteristics will not change owing to the relative arrangement of these optical elements. Japanese Patent Application Laid-Open No. 95525/1986 discloses a photoresist exposure apparatus in which a multiplicity of interference filters are arranged instead of the aforementioned diffraction grating. However, since the interference filters of the same number as that of the separated components of light are required, if the number of photometric wavelengths is numerous, mass production is difficult.

In addition, in a color photographic printer, Japanese Patent Application Laid-Open No. 134353/1989 discloses a technique in which light from an original picture is spectrally diffracted by means of a prism, a diffraction grating, or a spectral filter, an image of a part of a copy original is formed on a panel of a photoelectric sensor into the configuration of a slit. In this technique, different photometric positions are represented by rows of the panel, while spectral light corresponding to the photometric positions is converted to electrical signals by columns of the panel. If the diffraction grating or the spectral filter is employed, however, the same problem as the one described above is encountered. If the prism is used, since the light is separated by diffraction, there are drawbacks in that it is necessary to make the projected light into parallel light, that the apparatus becomes large in size, and that it is difficult to photometrically measure the spectra with the same quantity of light and by using the same panel, because of the spectral sensitivity distribution of the photoelectric sensor. In addition, owing to the drawback that there occurs a substantial decline in the quantity of light since the rows are decomposed into the columns, photometry is conducted by decreasing the spectral resolution, and an interpolation is provided for the photometrically measured spectra. Japanese Patent Application Laid-Open No. 142719/1989 discloses an arrangement in which a prism or a diffraction grating, as well as a lens and a two-dimensional array sensor, are used. Yet, since the prism or the diffraction grating is used, the same problem as the one described above is encountered.

Meanwhile, a method has been conceived in which the energy distribution of a light source used for photometry, the spectral sensitivity distribution of a photometric device, and the like are determined in advance, and through the calculation of a microcomputer photometric values are obtained which are equivalent to those obtained when photometry is conducted by a photometric device having a spectral sensitivity distribution equivalent to the spectral sensitivity distribution of a copying light-sensitive material.

That is, if it is assumed that the spectral energy distribution of a light source used for photometry is $P(\lambda)$, the spectral sensitivity distribution of the photometric device is $S(\lambda)$, and the spectral transmission distribution of development silver or a coloring dye on the film is $\rho(\lambda)$, a density D photometrically measured by a photometric device having wavelength regions s—l is expressed by the following Formula (1):

$$D = \log \frac{\int_s^l P(\lambda) \cdot S(\lambda) d\lambda}{\int_s^l P(\lambda) \cdot S(\lambda) \cdot \rho(\lambda) d\lambda} \tag{1}$$

where $$\int_s^l P(\lambda) \cdot S(\lambda) d\lambda$$

is a bundle of rays made incident upon the film, and $$\int_s^l P(\lambda) \cdot S(\lambda) \cdot \rho(\lambda) d\lambda$$

is a bundle of rays transmitted through the film.

Accordingly, in order to obtain the density D photometrically measured by the photometric device having a spectral sensitivity distribution equivalent to a spectral sensitivity distribution $S_P(\lambda)$ of the copying light-sensitive material, it

3 suffices if $S(\lambda)$ in Formula (1) above is substituted by the spectral sensitivity distribution $S_P(\lambda)$ of the copying light-sensitive material.

Since the spectral energy distribution $P(\lambda)$ of the light source and the spectral sensitivity distribution $S_P(\lambda)$ of the copying light-sensitive material are obtained by being measured in advance, if the spectral transmittance distribution $\rho(\lambda)$ of the film, which differs depending on the type of film, is estimated, a density photometrically measured by the photometric device having a spectral sensitivity distribution equivalent to that of the spectral sensitivity distribution of the copying light-sensitive material can be obtained from Formula (1) above. Then, exposure amount can be determined if this density is used.

In accordance with this method, since it is unnecessary to use a diffraction grating or a multiplicity of interference filters in the manner stated in the above-described prior art, the photometric device can be made compact and can be manufactured at low cost.

However, with the above-described method of calculation using a microcomputer, a method of accurately estimating the spectral transmittance distribution of the film has not been established, so that there has been a drawback in that photometric values obtained by the photometric device having a spectral sensitivity distribution equivalent to the spectral sensitivity distribution of the copying light-sensitive material cannot be obtained accurately by calculation.

SUMMARY OF THE INVENTION

Accordingly, it is an object of the present invention to provide a method of estimating a spectral distribution of a film, such as a spectral transmittance distribution, with a high degree of accuracy by using a small number of photometric values, thereby overcoming the above-described drawbacks of the conventional art.

To this end, in accordance with a first aspect of the invention, a plurality of principal-component spectral distributions are determined in advance by analyzing spectral distributions of a multiplicity of sample films; light transmitted through a film to be estimated is measured by spectrally diffracting the transmitted light into wavelengths of different bands or into different wavelength bands, the number of the wavelengths or wavelength bands being at least equivalent to that of the plurality of principal-component spectral distributions; coefficients for expressing the spectral distribution of the film to be estimated as the linear sum of the plurality of principal-component spectral distributions are determined on the basis of photometric values of the respective wavelengths or wavelength bands and the plurality of principal-component spectral distributions; and the spectral distribution of the film to be estimated is estimated by determining the linear sum of the plurality of principal-component spectral distributions by using the coefficients obtained.

In accordance with a second aspect of the invention, three principal-component spectral transmission density distributions are determined in advance by analyzing spectral transmission density distributions of a multiplicity of sample films of an identical film type; light transmitted through a film to be estimated of a film type identical to that of each of the sample films is measured by spectrally diffracting the transmitted light into three or more wavelengths of different bands or into three or more different wavelength bands; coefficients for expressing the spectral distribution of the film to be estimated as the linear sum of the three principal-component spectral transmission density distributions are determined on the basis of photometric values of the respec-

4 tive wavelengths or wavelength bands and the three principal-component spectral transmission density distributions; and the spectral transmission density distribution of the film to be estimated is estimated by determining the linear sum of the three principal-component spectral transmission density distributions by using the coefficients obtained.

In accordance with a third aspect of the invention, three principal-component spectral transmission density distributions are determined for each film type by analyzing spectral transmission density distributions of a multiplicity of sample films; light transmitted through a film to be estimated is measured by spectrally diffracting the transmitted light into three or more wavelengths of different bands or into three or more different wavelength bands, and a type of film to be estimated is determined; coefficients for expressing the spectral transmission density distribution of the film to be estimated as the linear sum of the three principal-component spectral transmission density distributions are determined on the basis of photometric values of the respective wavelengths or wavelength bands and the three principal-component transmission density distributions corresponding to the discriminated type of film to be detected; and the spectral transmission density distribution of the film to be estimated is estimated by determining the linear sum of the three principal-component spectral transmission density distributions corresponding to the discriminated type of film to be estimated by using the coefficients obtained.

In accordance with a fourth aspect of the invention, four or more principal-component spectral transmittance distributions are determined by analyzing spectral transmittance distributions of a multiplicity of sample films of a plurality of film types; light transmitted through a film to be estimated is measured by spectrally diffracting the transmitted light into wavelengths of different bands or into different wavelength bands, the number of the wavelengths or wavelength bands being at least equivalent to that of the principal-component spectral transmittance distributions; coefficients for expressing the spectral transmittance distribution of the film to be estimated as the linear sum of the four or more principal-component spectral transmittance distributions are determined on the basis of photometric values of the respective wavelengths or wavelength bands and the four or more principal-component spectral transmittance distributions; and the spectral transmittance distribution of the film to be estimated is estimated by determining the linear sum of the four or more principal-component spectral transmittance distributions by using the coefficients obtained.

In accordance with a fifth aspect of the invention, four or more principal-component spectral transmission density distributions are determined by analyzing spectral transmission density distributions of a multiplicity of sample films of a plurality of film types; light transmitted through a film to be estimated is measured by spectrally diffracting the transmitted light into wavelengths of different bands or into different wavelength bands, the number of the wavelengths or wavelength bands being at least equivalent to that of the principal-component spectral transmission density distributions; coefficients for expressing the spectral transmission density distribution of the film to be estimated as the linear sum of the four or more principal-component spectral transmission density distributions are determined on the basis of photometric values of the respective wavelengths or wavelength bands and the four or more principal-component spectral transmission density distributions; and the spectral transmission density distribution of the film to be estimated is estimated by determining the linear sum of the four or more principal-component spectral transmission density distributions by using the coefficients obtained.

In accordance with the first to fifth aspects of the invention, it is possible to obtain the advantage that the spectral distributions of one or a plurality of types of films can be estimated with a high degree of accuracy without increasing the number of spectral components separated by subjecting the light transmitted through the film to spectral diffraction.

Another object of the present invention is to provide a method of determining exposure amount by estimating a spectral distribution of a film, such as a spectral transmittance distribution, with a high degree of accuracy by using a small number of photometric values.

To this end, in accordance with a sixth aspect of the invention, on the basis of the spectral distribution estimated in the first aspect of the invention and by using a spectral sensitivity distribution of the copying light-sensitive material, a calculation is made of a transmission density which is equivalent to a transmission density obtained when an image on the film to be printed is photometrically measured by a photometric device having a spectral sensitivity distribution identical to an effective spectral sensitivity distribution of a copying light-sensitive material; and exposure amount for printing the image on the film to be printed onto the light-sensitive material is determined on the basis of the transmission density calculated.

The effective spectral sensitivity distribution of a copying light-sensitive material referred to herein and in the appended claim means a spectral sensitivity distribution of the copying light-sensitive material which takes into consideration the effect of the spectral characteristics of a copying optical system on the copying light-sensitive material. For instance, in a case where light in which a component of a certain wavelength is cut off is applied to the copying light-sensitive material, the effective spectral sensitivity distribution can be said to be equivalent to a spectral sensitivity distribution which effectively does not exhibit the sensitivity of that wavelength.

In accordance with a seventh aspect of the invention, a transmission density, which is equivalent to a transmission density obtained when an image on the film to be printed is photometrically measured by a photometric device having a spectral sensitivity distribution identical to a spectral sensitivity distribution of a copying light-sensitive material, is calculated by using the spectral transmission density distribution calculated in the second aspect of the invention, the spectral energy distribution of light to be made incident upon the film, and the spectral sensitivity distribution of the copying light-sensitive material; and exposure amount for printing the image on the film to be printed onto the copying light-sensitive material is determined on the basis of the transmission density calculated.

In accordance with an eighth aspect of the invention, a transmission density, which is equivalent to a transmission density obtained when an image on the film to be printed is photometrically measured by a photometric device having a spectral sensitivity distribution identical to a spectral sensitivity distribution of a copying light-sensitive material, is calculated by using the spectral transmission density distribution calculated in the third aspect of the invention, the spectral energy distribution of light to be made incident upon the film, and the spectral sensitivity distribution of the copying light-sensitive material; and exposure amount for printing the image on the film to be printed onto the copying light-sensitive material is determined on the basis of the transmission density calculated.

In accordance with a ninth aspect of the invention, in accordance with the fourth aspect of the invention, a transmission density, which is equivalent to a transmission density obtained when an image on the film to be printed is photometrically measured by a photometric device having a spectral sensitivity distribution identical to a spectral sensitivity distribution of a copying light-sensitive material, is calculated by using the spectral transmission density distribution calculated in the fourth aspect of the invention, the spectral energy distribution of light to be made incident upon the film, and the spectral sensitivity distribution of the copying light-sensitive material; and exposure amount for printing the image on the film to be printed onto the copying light-sensitive material is determined on the basis of the transmission density calculated.

In accordance with a tenth aspect of the invention, a transmission density, which is equivalent to a transmission density obtained when an image on the film to be printed is photometrically measured by a photometric device having a spectral sensitivity distribution identical to a spectral sensitivity distribution of a copying light-sensitive material, is calculated by using the spectral transmittance distribution calculated in the fifth aspect of the invention, the spectral energy distribution of light to be made incident upon the film, and the spectral sensitivity distribution of the copying light-sensitive material; and exposure amount for printing the image on the film to be printed onto the copying light-sensitive material is determined on the basis of the transmission density calculated.

In accordance with the seventh and eighth aspects of the invention, it is possible to obtain the advantage that the number of spectral components obtained by subjecting the light transmitted through the film to spectral diffraction can be reduced to a minimum, that it is possible to estimate the spectral transmission density distributions of one or a plurality of types of films with a high degree of accuracy, and that an optimum exposure amount can be determined by using the spectral transmission density distributions estimated.

In accordance with the sixth, ninth, and tenth aspects of the invention, it is possible to obtain the advantage that it is possible to estimate the spectral distributions of one or a plurality of types of films with a high degree of accuracy without increasing the number of spectral components obtained by subjecting the light transmitted through the film to spectral diffraction, and that an optimum exposure amount can be determined by using the spectral distributions estimated.

The above and other objects, features and advantages of the invention will become more apparent from the following detailed description of the invention when read in conjunction with the accompanying drawings.

BRIEF DESCRIPTION OF THE DRAWINGS

FIG. 3 is a schematic diagram of an automatic printer to which the present invention is applied;

FIG. 4 is a diagram illustrating 1st to 3rd principal-component spectral transmission density distributions of one type of negative film;

FIG. 13 is a diagram illustrating 4th to 6th principal-component transmittance distributions of the plurality of negative films; and FIG. 14 is a diagram illustrating 7th and 8th principal-component transmittance distributions of the plurality of negative films.

DESCRIPTION OF THE PREFERRED EMBODIMENTS

Figure 1:
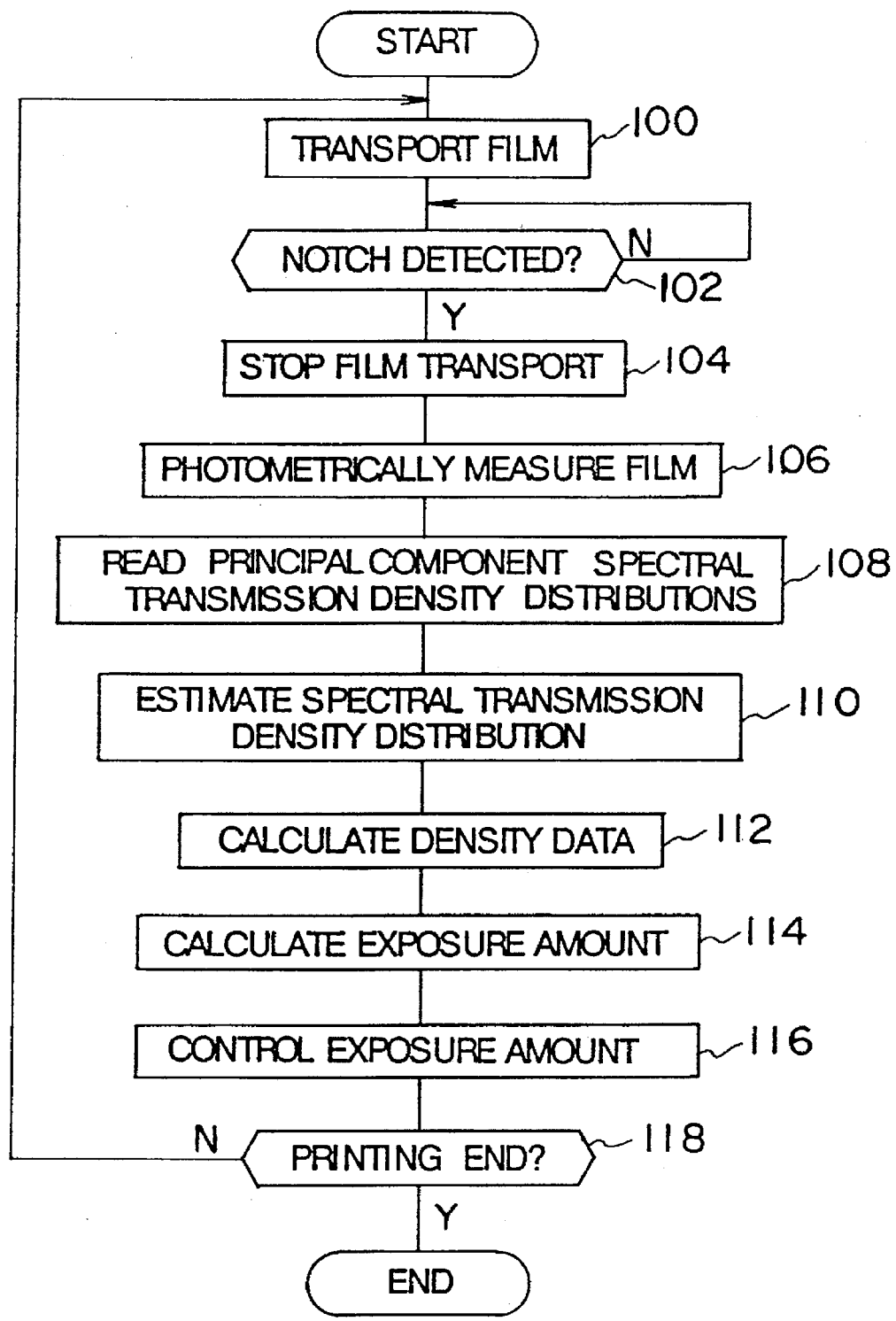
FIG. 1 is a flowchart illustrating a flowchart for controlling exposure amount in accordance with an embodiment of the present invention.

First, a description will be given of the basic principle of the present invention.

If it is assumed that a spectral transmittance distribution $\rho(\lambda)$ of a film can be estimated not necessarily by using all of N, i.e., 1st to the N-th, principal-component spectral transmittance distributions $e_1(\lambda), e_2(\lambda), e_3(\lambda), \ldots e_N(\lambda)$ but from a linear sum of k, i.e., 1st to the k-th, principal-component spectral transmittance distributions among them, this spectral transmittance distribution $\rho(\lambda)$ can be expressed by the following Formula (2):

$$\rho(\lambda) = a_1 e_1(\lambda) + a_2 e_2(\lambda) + a_3 e_3(\lambda) + \ldots + a_k e_k(\lambda) \quad (2)$$

where $a_1, a_2, \ldots a_k$ are coefficients.

These N principal-component spectral transmittance distributions $e_1(\lambda), e_2(\lambda), e_3(\lambda), \ldots e_N(\lambda)$ are determined by preparing M color samples of a multiplicity of colors (e.g. 72 colors) with respect to one or a plurality of types (e.g. 10 types) of color negative films, and by analyzing the measured results of a spectrometer. That is, spectral transmittances obtained by measuring the samples for each wavelength, for instance, at intervals of 5 nm to 10 nm with respect to wavelengths ranging from 400 nm to 760 nm are set as $\rho_1 - \rho_M$, as shown in Formula (3) below. In the case of 10 nm intervals, N=36. It should be noted that $\rho_{11}, \rho_{12}, \ldots \rho_{N1}$ in Formula (3) indicate spectral transmittances measured at 10 nm intervals, for instance.

$$\rho_1 = (\rho_{11}, \rho_{21}, \rho_{31}, \ldots, \rho_{N1}) \quad (3)$$
$$\rho_2 = (\rho_{12}, \rho_{22}, \rho_{32}, \ldots, \rho_{N2})$$
$$\cdot$$
$$\cdot$$
$$\rho_M = (\rho_{1M}, \rho_{2M}, \rho_{3M}, \ldots, \rho_{NM})$$

Formula (3) is employed in principal-component analysis to determine a principal-axis vector ei (where, i=1, 2, ... N).

As for the method of determination, a correlational matrix $\Sigma$ of Formula (4) below is first determined, and eigenvalues and eigenvectors are determined with respect to $\Sigma$.

$$\Sigma = \frac{1}{M} \begin{pmatrix} \sum_{i=1}^{M} \rho_{1i}^2 & \sum_{i=1}^{M} \rho_{1i}\rho_{2i} & \cdots & \sum_{i=1}^{M} \rho_{1i}\rho_{Ni} \\ \sum_{i=1}^{M} \rho_{2i}\rho_{1i} & \sum_{i=1}^{M} \rho_{2i}^2 & \cdots & \sum_{i=1}^{M} \rho_{2i}\rho_{Ni} \\ \cdot & \cdot & & \\ \cdot & \cdot & & \\ \cdot & \cdot & & \\ \sum_{i=1}^{M} \rho_{Ni}\rho_{1i} & \sum_{i=1}^{M} \rho_{Ni}\rho_{2i} & \cdots & \sum_{i=1}^{M} \rho_{Ni}^2 \end{pmatrix} \quad (4)$$

Since the matrix $\Sigma$ is a symmetric matrix, eigenvalues become 0 or more, and the eigenvalues are set in a descending order as $U_1^2, U_2^2, U_3^2, \ldots U_N^2$, and eigenvectors corresponding to the respective eigenvalues are normalized and set as $e_1, e_2, e_3, \ldots e_N$.

If the matrix e is set as $e=[e_1, e_2, e_3, \ldots e_N]$, we have $$e^T \Sigma e = \begin{pmatrix} U_1^2 & 0 & \cdots & 0 \\ 0 & U_2^2 & \cdots & 0 \\ \cdot & \cdot & & \cdot \\ \cdot & \cdot & & \cdot \\ \cdot & \cdot & & \cdot \\ 0 & 0 & \cdots & U_N^2 \end{pmatrix} \quad (5)$$

(where T is a transposed matrix)

Thus, the matrix is made symmetric. Here, if the vector ei is denoted by $ei(\lambda)$, the spectral transmittance distribution $\rho(\lambda)$ of the color sample can be expressed as $$\rho(\lambda) = \sum_{i=1}^{N} b_i e_i(\lambda) \quad (6)$$

An expression in which the terms up to the k-th term are summed in Formula (6) corresponds to Formula (2). Accordingly, if the coefficients $a_1, a_2, \ldots a_k$ in Formula (2) are determined, the spectral transmittance distribution $\rho(\lambda)$ of the film can be estimated. In addition, since the density is the logarithm of the transmittance, the spectral transmission density distribution can also be determined.

Next, a description will be given of a method of determining the coefficients $a_1, a_2, \ldots a_k$. If the spectral transmittance distribution $\rho(\lambda)$ of the film is expressed as a linear sum of principal-component spectral transmittance distributions $e_1(\lambda), e_2(\lambda), \ldots e_k(\lambda)$ by assuming that the spectral energy distribution of a light source is $P(\lambda)$, and that the spectral sensitivity distributions of k sensors are $S_1(\lambda), S_2(\lambda), \ldots S_k(\lambda)$, then the outputs of the respective sensors, i.e., photometric values, are expressed as $$\int P(\lambda) \cdot \rho(\lambda) \cdot S_1(\lambda) d\lambda = a_1 \int P(\lambda) \cdot e_1(\lambda) \cdot S_1(\lambda) d\lambda + \quad (7)$$
$$a_2 \int P(\lambda) \cdot e_2(\lambda) \cdot S_1(\lambda) d\lambda \ldots + a_k \int P(\lambda) \cdot e_k(\lambda) \cdot S_1(\lambda) d\lambda$$

$$\int P(\lambda) \cdot \rho(\lambda) \cdot S_2(\lambda) d\lambda = a_1 \int P(\lambda) \cdot e_1(\lambda) \cdot S_2(\lambda) d\lambda +$$
$$a_2 \int P(\lambda) \cdot e_2(\lambda) \cdot S_2(\lambda) d\lambda \ldots + a_k \int P(\lambda) \cdot e_k(\lambda) \cdot S_2(\lambda) d\lambda$$

$$\int P(\lambda) \cdot \rho(\lambda) \cdot S_k(\lambda) d\lambda = a_1 \int P(\lambda) \cdot e_1(\lambda) \cdot S_k(\lambda) d\lambda +$$
$$a_2 \int P(\lambda) \cdot e_2(\lambda) \cdot S_k(\lambda) d\lambda \ldots + a_k \int P(\lambda) \cdot e_k(\lambda) \cdot S_k(\lambda) d\lambda$$

Here, if the photometric values $\int P(\lambda) \cdot \rho(\lambda) \cdot S_1(\lambda) d\lambda$, $\int P(\lambda) \cdot \rho(\lambda) \cdot S_2(\lambda) d\lambda, \ldots \int P(\lambda) \cdot \rho(\lambda) d\lambda$, are respectively set as $q_1, q_2, \ldots q_k$, and the photometric values $\int P(\lambda) \cdot e_1(\lambda) \cdot S_1(\lambda) d\lambda$, $\int P(\lambda) \cdot e_2(\lambda) \cdot S_1(\lambda) d\lambda, \ldots \int P(\lambda) \cdot e_k(\lambda) \cdot S_k(\lambda) d\lambda$ are set as $e_{11}$, $e_{21}, \ldots e_{kk}$, and if they are expressed as matrices, we have $$\begin{pmatrix} q_1 \\ q_2 \\ \cdot \\ \cdot \\ \cdot \\ q_k \end{pmatrix} = \begin{pmatrix} e_{11}, & e_{21}, & \ldots, & e_{k1} \\ e_{12}, & e_{22}, & \ldots, & e_{k2} \\ \cdot & & & \cdot \\ \cdot & & & \cdot \\ \cdot & & & \cdot \\ e_{1k}, & e_{2k}, & \ldots, & e_{kk} \end{pmatrix} \begin{pmatrix} a_1 \\ a_2 \\ \cdot \\ \cdot \\ \cdot \\ a_k \end{pmatrix} = e_k \begin{pmatrix} a_1 \\ a_2 \\ \cdot \\ \cdot \\ \cdot \\ a_k \end{pmatrix} \qquad (8)$$

$$\begin{pmatrix} a_1 \\ a_2 \\ \cdot \\ \cdot \\ \cdot \\ a_k \end{pmatrix} = \begin{pmatrix} e_{11}, & e_{21}, & \ldots, & e_{k1} \\ e_{12}, & e_{22}, & \ldots, & e_{k2} \\ \cdot & & & \cdot \\ \cdot & & & \cdot \\ \cdot & & & \cdot \\ e_{1k}, & e_{2k}, & \ldots, & e_{kk} \end{pmatrix}^{-1} \begin{pmatrix} q_1 \\ q_2 \\ \cdot \\ \cdot \\ \cdot \\ q_k \end{pmatrix} \qquad (9)$$

thus the coefficients $a_1, a_2, \ldots a_k$ are obtained. Then, by substituting these values for Formula (2), the spectral transmittance distribution $\rho(\lambda)$ of the film can be estimated. In addition, the spectral transmission strength distribution or the spectral transmission density distribution can be estimated from this spectral transmittance distribution.

In the above, a description has been given of an example in which photometry is conducted by using sensors each displaying a spectral distribution of a predetermined width, but in a case where the spectral distributions of the sensors are narrow bands, photometry is conducted for each wavelength $\lambda_1, \lambda_2, \ldots \lambda_k$. In this case, a formula corresponding to Formula (7) becomes such as Formula (10) below, while a formula corresponding to Formula (9) becomes such as Formula (11) below.

$$\rho(\lambda_1) = a_1 \cdot e_1(\lambda_1) + a_2 \cdot e_2(\lambda_1) + \ldots + a_k \cdot e_k(\lambda_1) \qquad (10)$$
$$\rho(\lambda_2) = a_1 \cdot e_1(\lambda_2) + a_2 \cdot e_2(\lambda_2) + \ldots + a_k \cdot e_k(\lambda_2)$$
$$\cdot$$
$$\rho(\lambda_k) = a_1 \cdot e_1(\lambda_k) + a_2 \cdot e_2(\lambda_k) + \ldots + a_k \cdot e_k(\lambda_k)$$

$$\begin{pmatrix} a_1 \\ a_2 \\ \cdot \\ \cdot \\ \cdot \\ a_k \end{pmatrix} = \begin{pmatrix} e_1(\lambda_1), & e_2(\lambda_1), & \ldots, & e_k(\lambda_1) \\ e_1(\lambda_2), & e_2(\lambda_2), & \ldots, & e_k(\lambda_2) \\ \cdot & & & \cdot \\ \cdot & & & \cdot \\ \cdot & & & \cdot \\ e_1(\lambda_k), & e_2(\lambda_k), & \ldots, & e_k(\lambda_k) \end{pmatrix}^{-1} \begin{pmatrix} \rho(\lambda_1) \\ \rho(\lambda_2) \\ \cdot \\ \cdot \\ \cdot \\ \rho(\lambda_k) \end{pmatrix} \qquad (11)$$

Although, in the above, the principal-component spectral transmittance distributions have been used, the spectral transmission density distribution can be estimated by using 1st to the k-th principal-component spectral transmission density distributions obtained by analyzing the spectral transmission density distributions of one or a plurality of types (e.g. 10 types) of sample films, as follows.

First, if a spectral transmission density distribution $D(\lambda)$ is expressed by a linear sum of principal-component spectral transmission density distributions $e'_j(\lambda)$ (j=1, 2, ... k), we have $$D(\lambda) = \sum_{j=1}^{k} a_j e'j(\lambda) \qquad (12)$$

Meanwhile, the photometric value $q_1$ (i=1, 2, ... k) is expressed as follows.

$$q_i = \int P(\lambda) \cdot \rho(\lambda) \cdot S_i(\lambda) d\lambda \qquad (13)$$

Since the relationship of $D(\lambda) = -\log \rho(\lambda)$ holds between the transmittance and the density, Formula (13) can be expressed by using $D(\lambda)$, as follows.

$$q_i = \int P(\lambda) \cdot 10^{-D(\lambda) \cdot S_i(\lambda)} d\lambda$$

That is, $$q_i = \int P(\lambda) \cdot 10^{-\sum_{j=1}^{k} a_j e'j(\lambda)} \cdot S_i(\lambda) d\lambda \qquad (14)$$

By solving Formula (14) by making use of a nonlinear optimization method (e.g. Newton-Raphson's method), the coefficient $a_j$ can be obtained. If this coefficient $a_j$ and the principal-component spectral transmission density distribution $e'_j(\lambda)$ are used, it is possible to estimate the spectral transmission density distribution from Formula (12). In addition, it is possible to estimate the spectral transmittance distribution and the like from this spectral transmission density distribution.

In the case where the sensitivity distribution of the sensor is a narrow band, in the case of one point at a specific wavelength $\lambda_0$, for example, Formula (14) is expressed as shown below, so that it becomes easy to obtain the solution of $a_j$.

$$q_i = P(\lambda_0) \cdot 10^{-\sum_{j=1}^{k} a_j e'j(\lambda_0)} \cdot S_i(\lambda_0) \qquad (15)$$

In a case where solutions of the coefficients $a_1, a_2, a_3, \ldots a_k$ are obtained by means of a computer by setting the number of photometric values and the number of principal-component spectral transmittance distributions or principal-component spectral transmission density distributions to be identical and by using Formulae (9) and (14), there are cases where it is difficult to obtain the solutions. In that case, it suffices if the number of photometric values using the sensors is increased by 1 or several and a calculation is conducted as explained below. If the number of the photometric values is increased to an excess, it becomes necessary to use a multiplicity of interference filters as in the conventional case, so that it is preferred that the number of the photometric values is increased by 1 or 2. In the material below, a description will be given of an example in which the number of the photometric values is increased by 1 in a case where the spectral transmittance distribution is estimated by using the principal-component spectral transmittance distributions, but the same holds true of a case where the number of the photometric values is increased by 2 or more, or the principal-component spectral transmission density distributions are used. If the increased photometric value is assumed to be $q_{k+1}$, Formula (8) is rewritten as $$\begin{pmatrix} q_1 \\ q_2 \\ \cdot \\ \cdot \\ \cdot \\ q_k \\ q_{k+1} \end{pmatrix} = \begin{pmatrix} e_{11}, & e_{21}, & \ldots, & e_{k1} \\ e_{12}, & e_{22}, & \ldots, & e_{k2} \\ \cdot & & & \cdot \\ \cdot & & & \cdot \\ \cdot & & & \cdot \\ e_{1k}, & e_{2k}, & \ldots, & e_{kk} \\ e_{1k+1}, & e_{2k+1}, & \ldots, & e_{kk+1} \end{pmatrix} \begin{pmatrix} a_1 \\ a_2 \\ \cdot \\ \cdot \\ \cdot \\ a_k \end{pmatrix} \qquad (16)$$

Formula (16) is expressed as follows:

$$[q] = [e][a] \qquad (17)$$

If both sides of Formula (17) are multiplied by a transposed matrix $[e]^T$ of $[e]$, then $[e]^T [e]$ become square matrices, so that if they are substituted by [E], [a] can be expressed from Formula (17) as follows:

$$[e]^T[q] = [e]^T[e][a]$$
$$= [E][a]$$

That is, $$[a]=[E]^{-1}[e]^T[q] \quad (18)$$

Accordingly, the spectral distribution of the film to be estimated can be estimated by the following procedure: A plurality of principal-component spectral distributions (principal-component spectral transmittance distributions, principal-component spectral transmission density distributions, and so on) are determined in advance by analyzing the spectral distributions of a plurality of sample films, such as the spectral transmittance distributions and the spectral transmission density distributions. The light transmitted through the film to be estimated is subjected to photometry by being spectrally diffracted into wavelengths or wavelength bands of a number greater than or equal to that of the principal-component spectral distributions. Coefficients for expressing the spectral distribution of the film to be estimated as a linear sum of the plurality of principal-component spectral distributions are determined on the basis of the photometric values and the plurality of principal-component spectral distributions. The spectral distribution of the film to be estimated is estimated by determining the linear sum of the plurality of principal-component spectral distributions by using the coefficients obtained.

Although the number of principal-component spectral distributions depends on the number of sample films, if 3–10 spectral distributions or thereabouts are used, the spectral distributions can be estimated with sufficient accuracy in practical use. Hence, the number of spectral distributions obtained by spectrally diffracting the light transmitted through the film to be estimated is not less than 3 and up to 10 or thereabouts, 15 or thereabouts at maximum, so that it is possible to estimate the spectral distribution of the film with excellent accuracy.

Figure 2A:
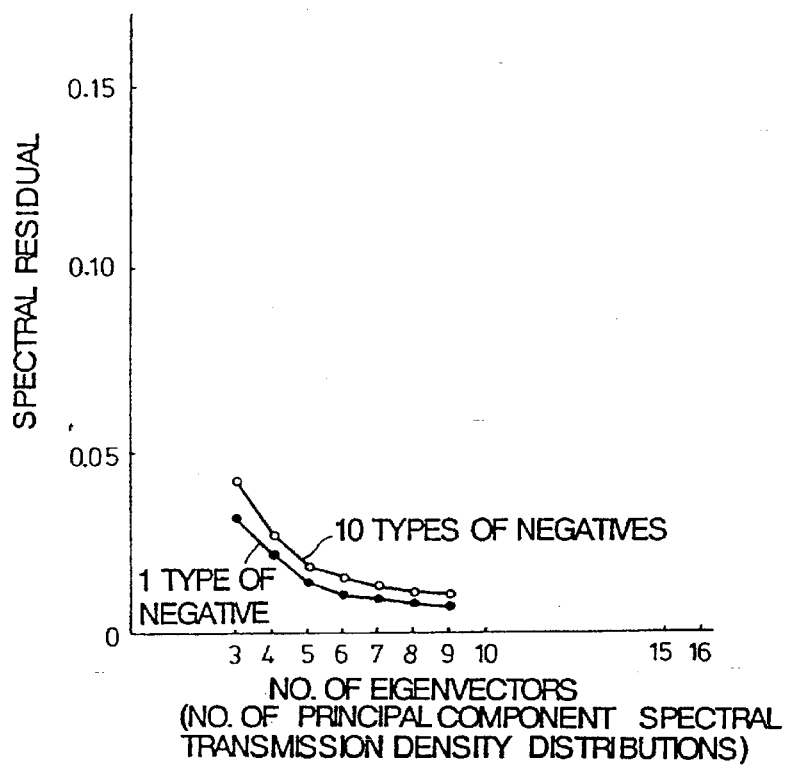
FIGS. 2A and 2B are diagrams illustrating the relationship between the number of eigenvectors and the spectral residual.

The results shown in FIG. 2A were obtained when the present inventors examined the relationship between the number of principal-component spectral transmission density distributions obtained by analyzing spectral transmission density distributions of one type of negative film and the spectral residual of estimated values with respect to measured values, as well as the relationship between the number of principal-component spectral transmission density distributions obtained by analyzing the spectral transmission density distributions of 10 types of negative films and the spectral residual. As can be appreciated from FIG. 2A, if three, i.e., 1st to the 3rd, principal-component spectral transmission density distributions were used, with respect to one type of negative film, the spectral residual was small and excellent results were obtained. Accordingly, with respect to the same type of negative film as the negative film obtained whose principal-component spectral transmission density distributions were determined, it is possible to obtain its spectral transmission density distribution if at least three principal-component spectral transmission density distributions are used.

In addition, the spectral transmission density distribution can be estimated with respect to all the film types if three principal-component spectral transmission density distributions are determined in advance for each film type, the film type is determined accordingly, and the spectral transmission density distribution is estimated for each of the film types discriminated, by using three principal-component spectral transmission density distributions corresponding to the film.

Meanwhile, if four, i.e., 1st to the 4th, principal-component spectral transmission density distributions among the spectral transmission density distributions obtained from 10 types of negative films are used, the spectral residual becomes substantially the same as in the case where the three principal-component spectral transmission density distributions were used for one type of negative film. Accordingly, with respect to a plurality of negative films, if at least four principal-component spectral transmission density distributions are used, the spectral transmission density distribution can be determined without needing to specify the film type.

Figure 2B:
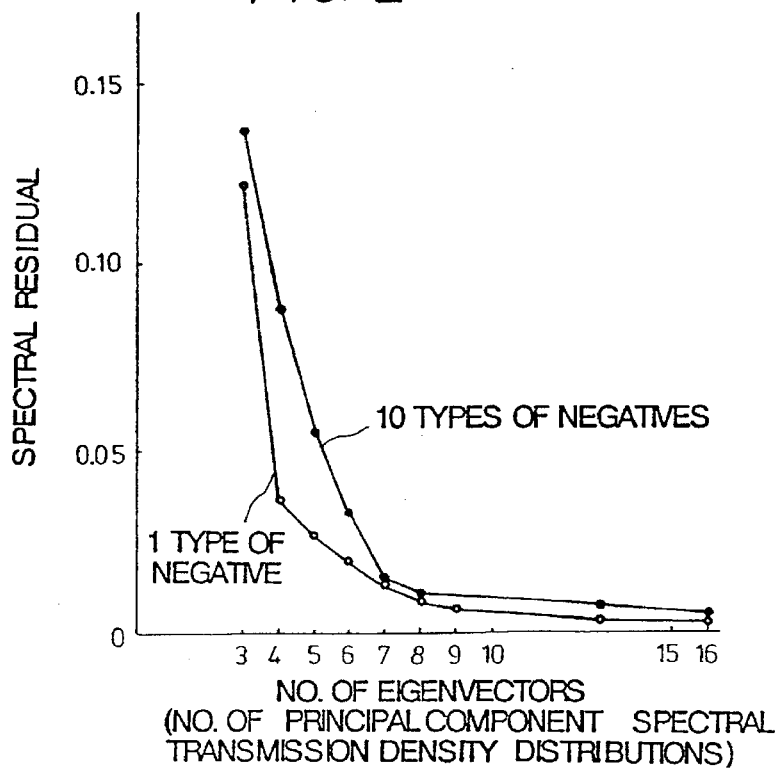

FIG. 2B shows the relationship between the number of principal-component spectral transmittance distributions obtained by analyzing spectral transmittance distributions of one type of negative film and the spectral residual, as well as the relationship between the number of principal-component spectral transmittance distributions obtained by analyzing the spectral transmittance distributions of 10 types of negative films and the spectral residual. As can be appreciated from the drawing, if four, i.e., 1st to the 4th, principal-component spectral transmittance distributions are used, it is possible to estimate the spectral transmittance distribution with a relatively small spectral residual. In this case, since better estimation accuracy can be obtained if the film type is specified, in a case where four or five principal-component spectral transmittance distributions are used, it is preferable to specify the film type.

In addition, it has been verified that if the sum of eight terms, i.e., $$\rho(\lambda)=a_1 \cdot e_1(\lambda)+a_2 \cdot e_2(\lambda)+\ldots +a_8 \cdot e_8(\lambda)$$

is used, namely, if 1st to the 8th principal-component spectral transmittance distributions are used, the spectral transmittance distribution of a film can be estimated with a density error of 0.03 or thereabouts with respect to all the film types without discriminating the film type.

It should be noted that the minimum value of the principal-component spectral transmittance distributions, at a time when the spectral transmittance distributions of a plurality of film types without discriminating the film type are estimated, is 4. This is because if the number of principal-component spectral transmittance distributions is set to 3, the estimation accuracy deteriorates, as described above. In addition, if the number is set to 9 or more, although the estimation accuracy improves, there is no major difference with the case where the number is set to 8. Even if the appearance of unknown films in the future is taken into consideration in addition to all the presently available color films, the required number of principal-component spectral transmittance distributions is 15 or thereabouts at maximum.

In the method of determining exposure amount in accordance with the present invention, by using an estimated spectral transmittance distribution, a spectral energy distribution of a light source, and a spectral sensitivity distribution of a copying light-sensitive material, a calculation is conducted of a transmission density equivalent to a transmission density at a time when an image on a film to be printed is subjected to photometry by a photometric device displaying the same spectral sensitivity distribution as the spectral sensitivity distribution of the copying light-sensitive material. Then, an exposure amount for printing the image on the film to be printed onto the copying light-sensitive material is determined on the basis of the transmission density thus calculated. Alternatively, the spectral transmission density may be estimated by using the principal-component spectral transmission density distributions instead of the principal-component spectral transmittance distributions, and the exposure amount may be determined by using this spectral transmission density. In addition, in cases where the spectral energy distribution of the light source is fixed or can be regarded as being fixed, the aforementioned transmission density may be calculated by using the estimated spectral distribution of the film and the spectral distribution of the copying light-sensitive material.

A description will now be given of an embodiment in which the method of estimating the spectral distribution of a film in accordance with the present invention is applied to a photographic printing method.

FIG. 3 shows a schematic diagram of an automatic printer for printing photographs according to this printing method. A mirror box 18 and a lamp house 10 having a halogen lamp are arranged below a color negative film 20 loaded in a negative carrier 21 and transported to a printing station. A light-adjusting filter 60 is interposed between the mirror box 18 and the lamp house 10. The light-adjusting filter 60 is comprised of three filters, yellow (Y), magenta (M), and cyan (C) filters in a conventionally known manner.

A lens 22, a black shutter 24, and a color paper 26 are disposed above the negative film 20 in that order. The arrangement provided is such that rays of light emitted from the lamp house 10 and transmitted through the light-adjusting filter 60, the mirror box 18, and the negative film 20 allow an image on the negative film 20 to be focused on the color paper 26 by means of the lens 22.

A DX code indicating the type of color negative film is recorded on an edge of the color negative film 20, and notches are formed therein. To detect the DX code and the notches, a detector 52 constituted by a light-emitting element and a light-receiving element is arranged in such a manner as to sandwich the edge of the negative film 20.

A photometric device 28 is disposed in a direction inclined with respect to the optical axis of the above-described image-forming optical system and at a position where it is capable of photometrically measuring the image density of the negative film 20. This photometric device 28 is constituted by three filters respectively having central wavelengths of 450±5 nm, 550±5 nm, and 700±5 nm and half-widths of 15–50 nm as well as a two-dimensional image sensor. By means of this photometric device 28, the light transmitted through the color negative film can be spectrally diffracted into three wavelength bands and can be photometrically measured.

The photometric device 28 is connected to an exposure determining device 32, constituted by a microcomputer, via an image data memory 30 for storing image data photometrically measured by the photometric device 28. The exposure determining device 32 has input/output ports 34, a central processing unit (CPU) 36, a read-only memory (ROM) 38, a random-access memory (RAM) 40, and a bus 42 including data buses for connecting them and a control bus. Stored in advance in the ROM 38 for each film type are the program of a routine for controlling exposure amount, which will be described later, and three principal-component spectral transmission density distributions (normalized by a density of 1.0), $e_1(\lambda)$, $e_2(\lambda)$, $e_3(\lambda)$, expressed in terms of the transmission density with respect to the wavelength as plotted in FIG. 4. In FIG. 4, although principal-component spectral transmission density distributions with respect to one film type are shown, other types of film also display substantially the same distributions. In addition, also stored in advance in the ROM 38 are the spectral energy distribution of the halogen lamp in the lamp house 10, the spectral sensitivity distribution of the paper used, three spectral sensitivity distributions of the photometric device corresponding to the transmitted wavelength bands of the aforementioned three filters, and the like. The exposure determining device 32 is connected to the image data memory 30 so as to control the write and read timings of the image data memory 30, and is connected in such a manner as to drive the photometric device 28. In addition, the input/output ports 34 are connected to the negative carrier 21 via a drive circuit 48, and are also connected to the light-adjusting filter 60 via a drive circuit 50 and to the black shutter 24 via a drive circuit 54. Also, a keyboard 44, a detector 52, and a CRT 46 are connected to the input/output ports 34.

Referring now to FIG. 1, a description will be given of an exposure controlling routine stored in advance in the ROM 38 of the exposure determining device 32. When the negative film 20 is loaded into the negative carrier 21 and a switch is turned on, in Step 100, the negative carrier 21 is driven by the drive circuit 48 to transport the negative film 20. While the negative film 20 is being transported, the DX code is read by the detector 52, and the notch is also detected thereby. In an ensuing Step 102, a determination is made as to whether or not the notch has been detected by the detector 52. If it is determined that the notch has been detected, in Step 104, the transport of the negative film 20 is stopped so as to stop a frame image at a printing/exposing position. In Step 106, the photometric device 28 is driven to photometrically measure the transmission density of the negative film 20. Since the photometric device 28 has three filters, the transmission density of the negative film is subjected to spectral diffraction into three wavelength bands and is subjected to photometry.

Figure 5:
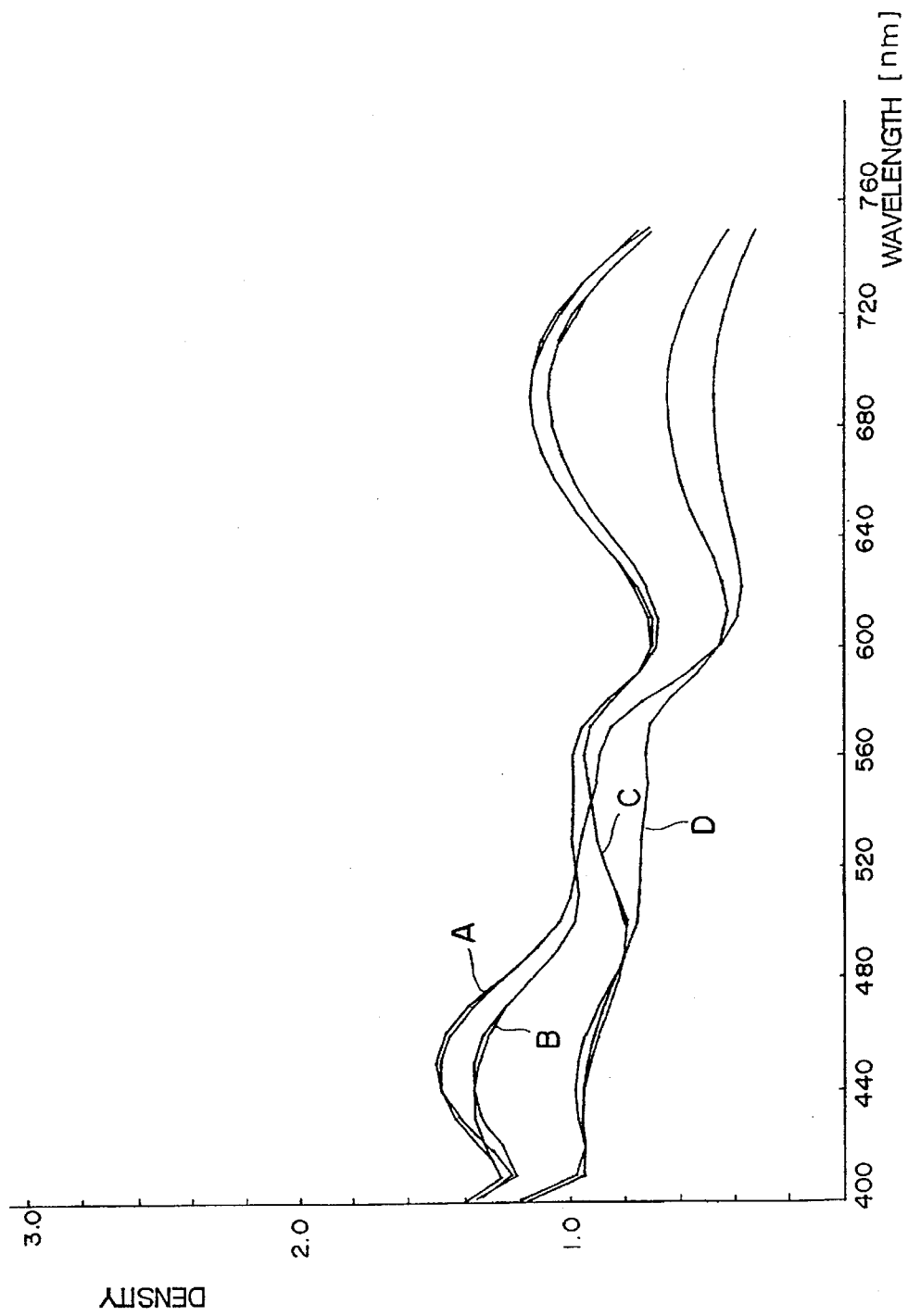
FIG. 5 is a diagram illustrating a comparison between estimated spectral transmission density distributions and actually measured spectral transmission density distributions.

In an ensuing Step 108, the film type is determined by the DX code read, and three principal-component spectral transmission density distributions corresponding to the discriminated film type are read from the ROM. In Step 110, the spectral transmission density distribution of the negative film 20 is estimated by using the photometric values obtained by the photometric device 28, the principal-component spectral transmission density distributions stored in the ROM, the spectral energy distribution of the halogen lamp, and the spectral sensitivity distribution of the photometric device, as described above. It should be noted that the values thus estimated agree with the actually measured values with high accuracy, as shown in FIG. 5. FIG. 5 is a diagram in which measured values and estimated values are plotted with respect to four types of images, A, B, C, and D. Although permissible errors occurred in the vicinities of 440 nm, 620 nm, and 720 nm, substantial agreement was obtained in other regions.

In Step 112, a transmission density, which is equivalent to a transmission density photometrically measured by the photometric device displaying the same spectral sensitivity distribution as the spectral sensitivity distribution of the paper, is calculated by using a formula similar to Formula (1) and by using the spectral transmission density distribution estimated in Step 110, the spectral energy distribution of the halogen lamp, and the spectral sensitivity distribution of the paper.

It should be noted that, when the paper is changed, the spectral sensitivity distribution of the paper used may be selected by means of the keyboard after the spectral sensitivity distributions of a plurality of types of papers are stored in advance in the ROM. Alternatively, the spectral sensitivity distribution of a necessary paper stored in an external memory such as a floppy disk may be read into the RAM. In addition, when the lamp is replaced, the spectral energy distribution of the lamp may be changed. For that purpose, the spectral energy distribution of the lamp may be photometrically measured by the photometric device 28 directly or via a filter, or the spectral energy distribution of the lamp may be used after being constantly corrected by means of an exclusive-use lamp monitoring sensor.

Then, in Step 114, an exposure amount is calculated on the basis of the transmission density calculated. In Step 116, the light-adjusting filter 60 is controlled on the basis of this exposure amount so as to effect exposure control. In Step 118, a determination is made as to whether or not printing has been completed for all the frames, and if it has not been completed, the operation returns to Step 100 to repeat the foregoing steps, and if it has been completed, this routine ends.

Although, in the above, three principal-component spectral transmission density distributions are stored for each film type, an arrangement may be provided such that only the three principal-component spectral transmission density distributions of a particular film type are stored, and only this particular film type among a plurality of film types without discriminating the film type is distinguished separately in advance, so as to estimate the spectral transmission density distribution of the particular film type.

Figure 6:
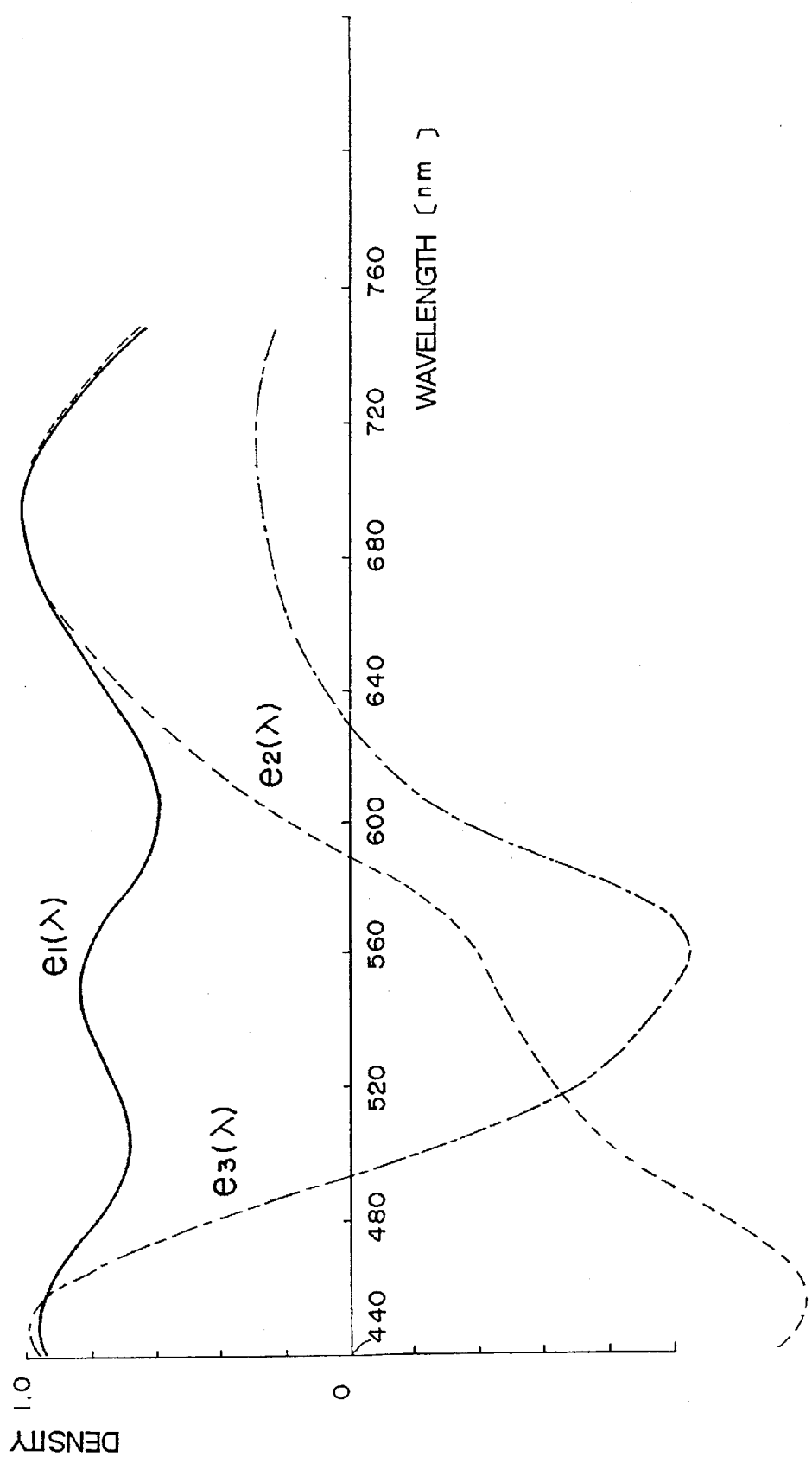
FIG. 6 is a diagram illustrating 1st to 3rd principal-component transmission density distributions of a plurality of negative films.
Figure 7:
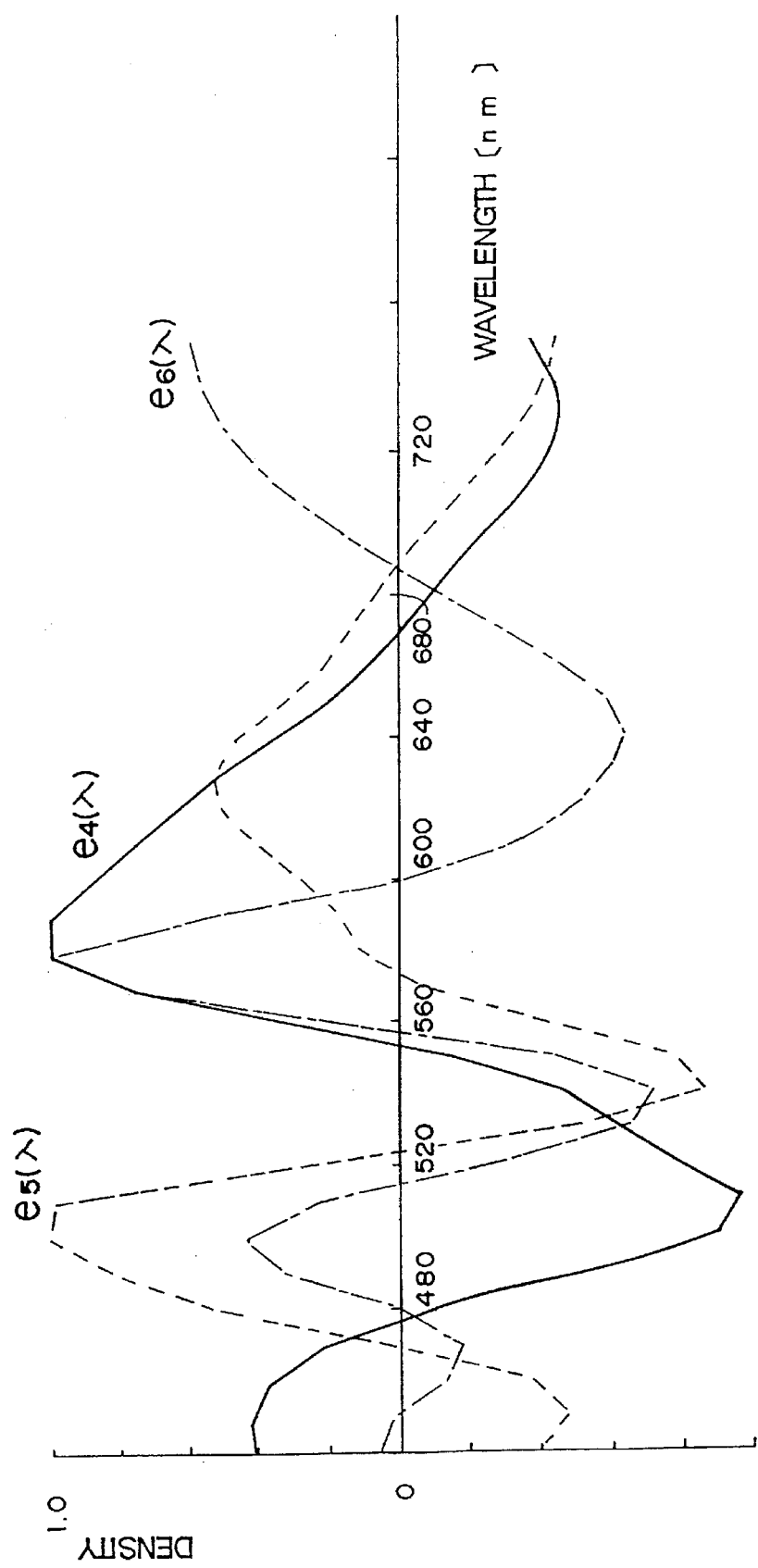
FIG. 7 is a diagram illustrating 4th to 6th principal-component transmission density distributions of the plurality of negative films.
Figure 8:
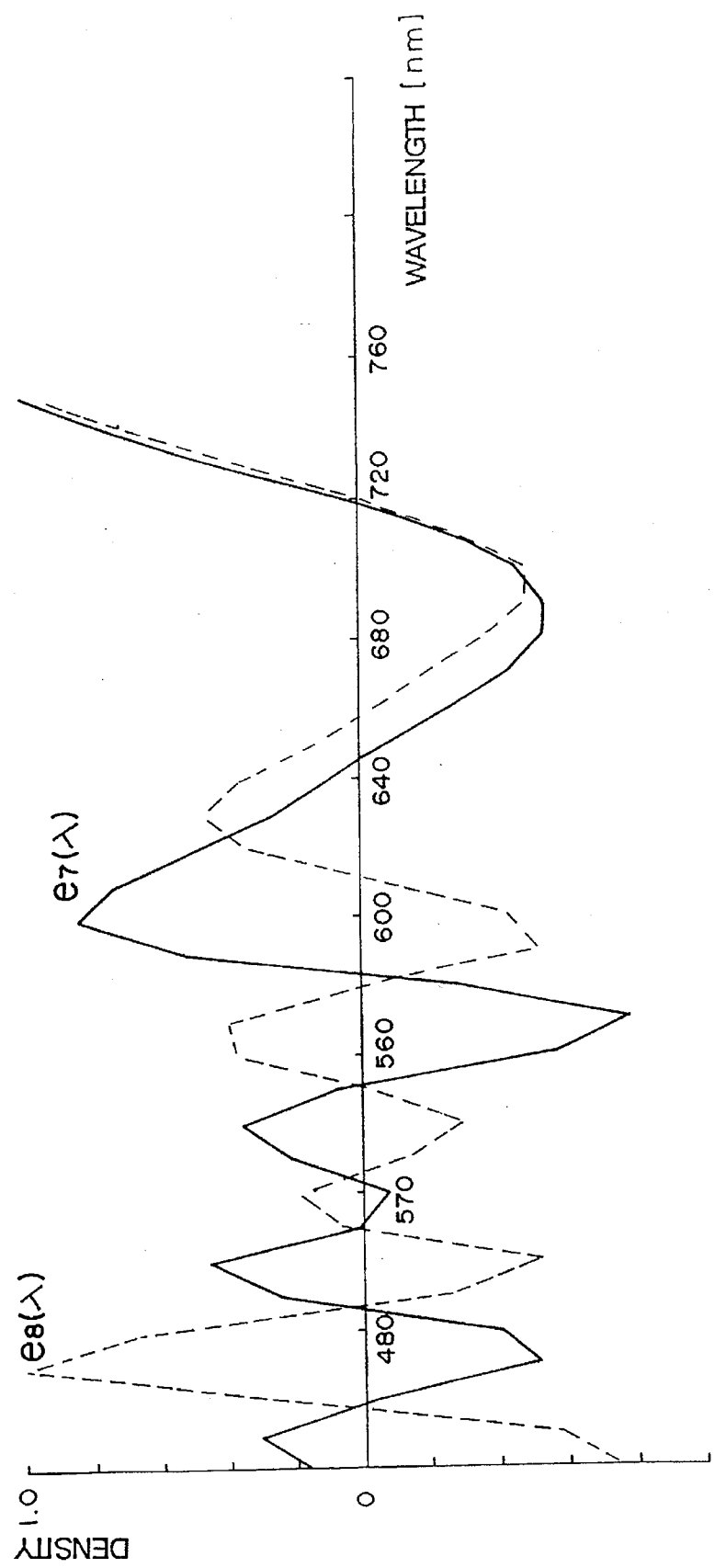
FIG. 8 is a diagram illustrating 7th and 8th principal-component transmission density distributions of the plurality of negative films.

In addition, the principal-component spectral transmission density distributions (normalized by a density of 1.0) shown in FIGS. 6 to 8 may be stored in the ROM, and the spectral distribution may be estimated without discriminating the film type. When the film type is not discriminated, the above-described reading of the DX code is unnecessary.

Figure 9:
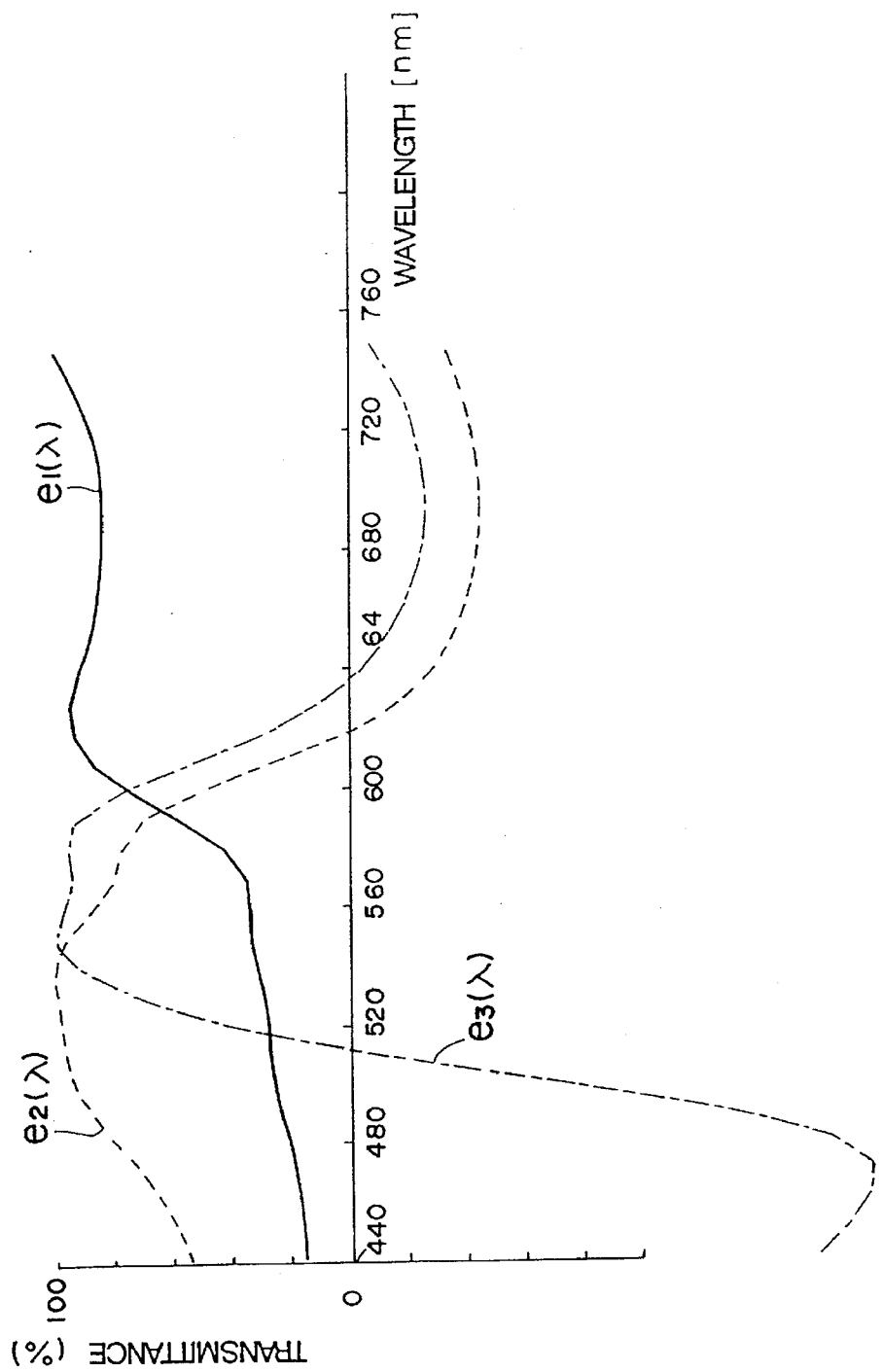
FIG. 9 is a diagram illustrating 1st to 3rd principal-component transmittance distributions of one type of negative film.
Figure 10:
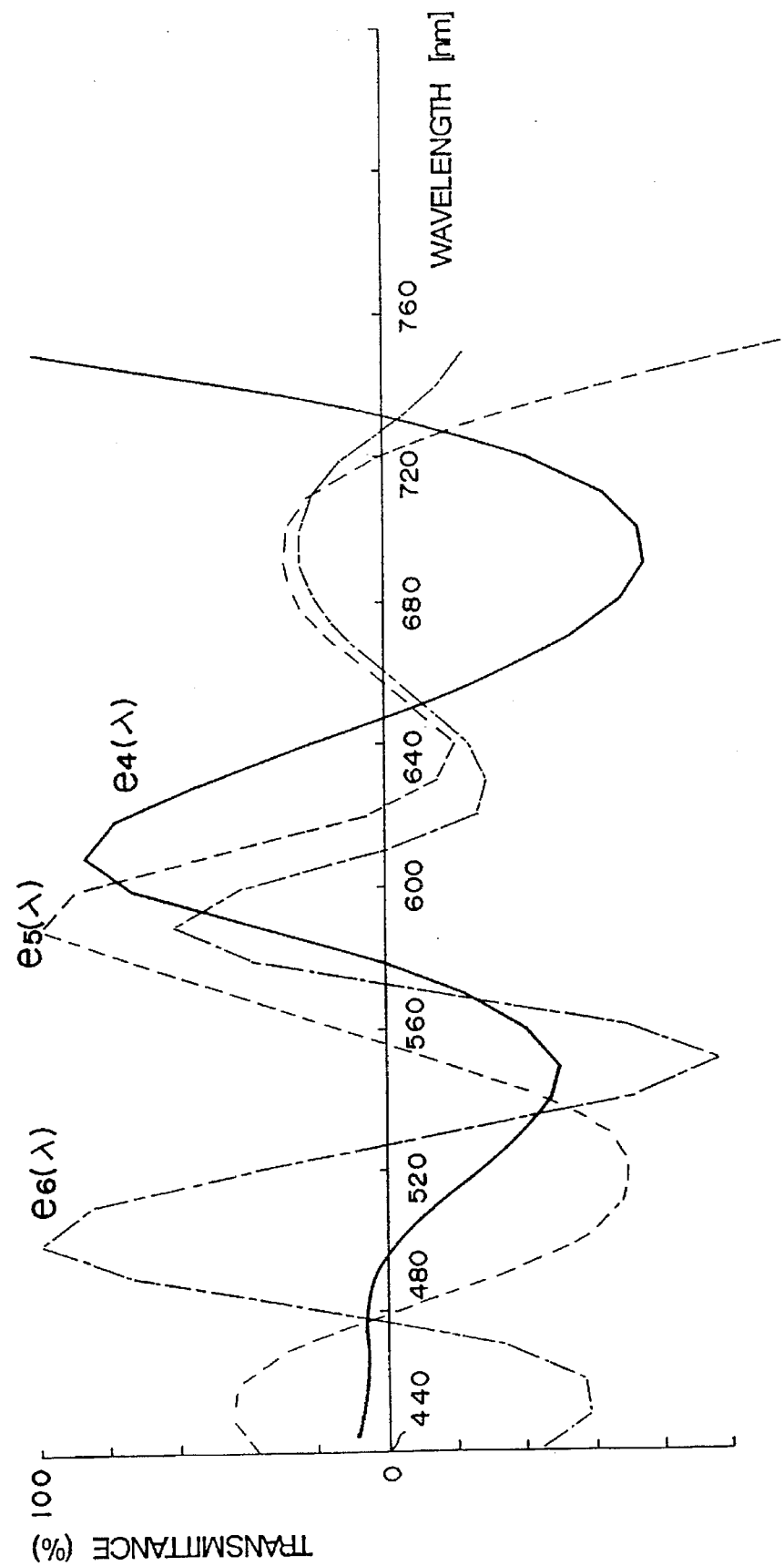
FIG. 10 is a diagram illustrating 4th to 6th principal-component transmittance distributions of one type of negative film.
Figure 11:
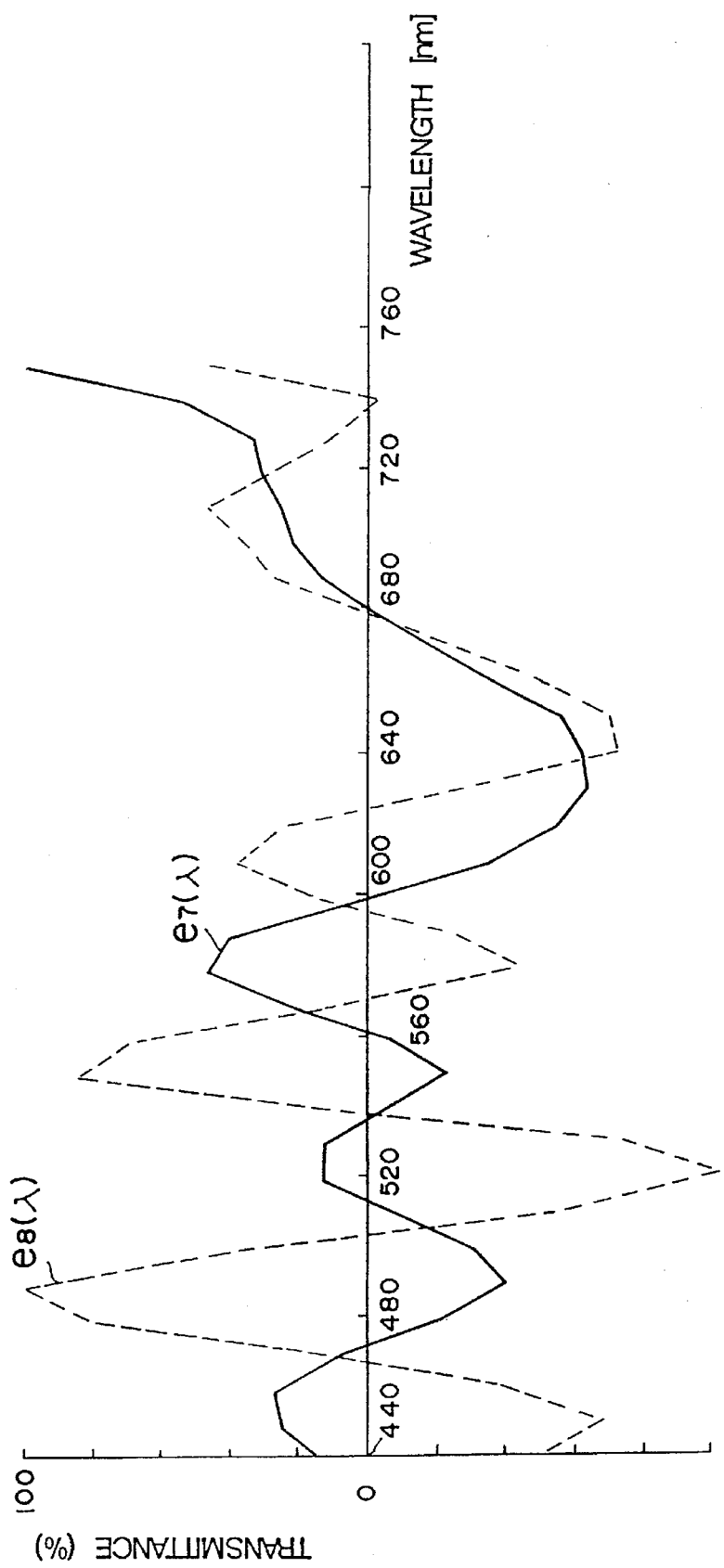
FIG. 11 is a diagram illustrating 7th and 8th principal-component transmittance distributions of one type of negative film.

Furthermore, the principal-component spectral transmission density distributions (normalized by a transmittance of 100%), $e_1(\lambda)$–$e_8(\lambda)$, obtained from one film type and shown in FIGS. 9 to 11 may be stored in the ROM for each film type, and the spectral distribution may be estimated by discriminating the film type.

Figure 12:
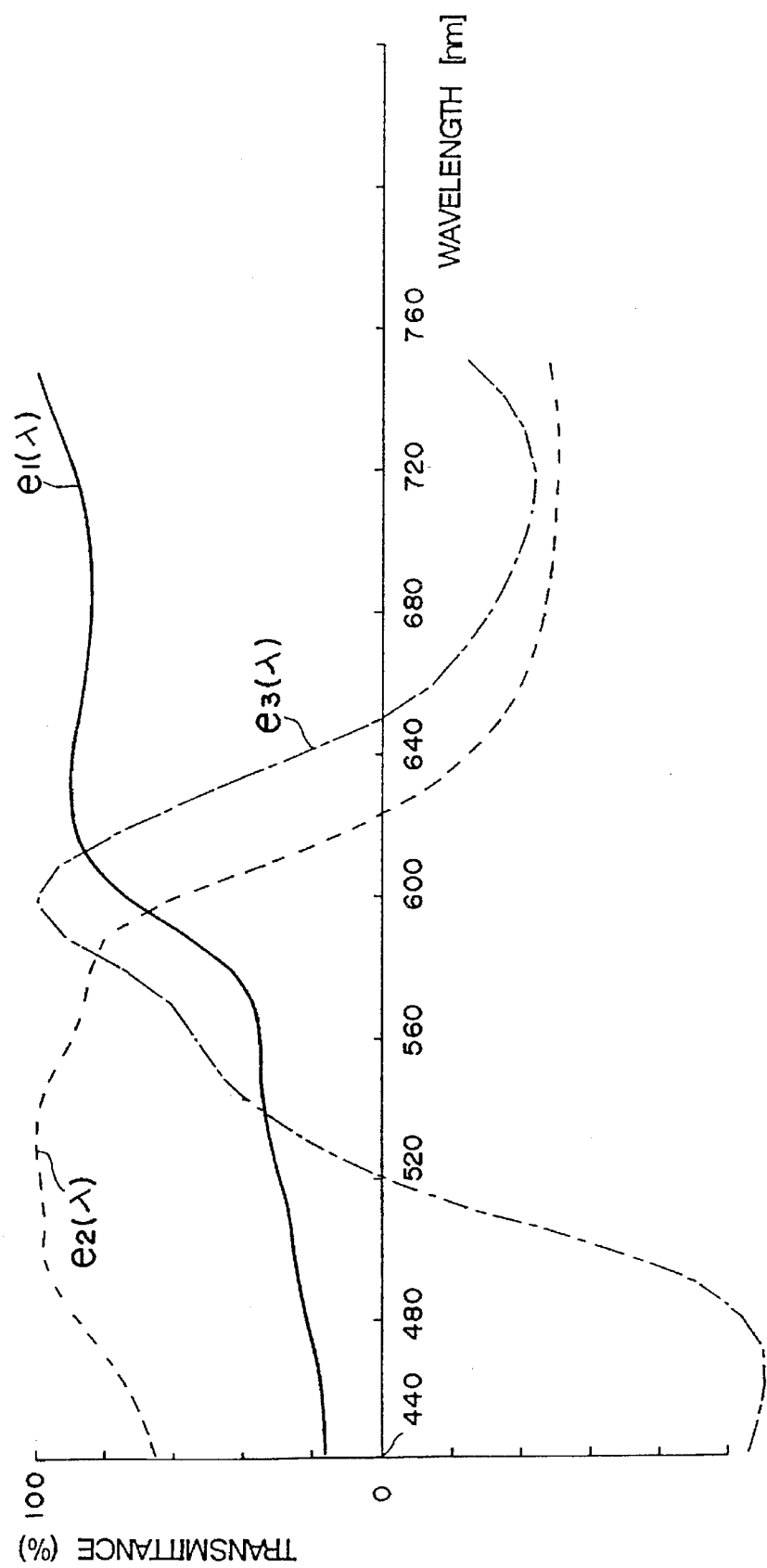
FIG. 12 is a diagram illustrating 1st to 3rd principal-component transmittance distributions of the plurality of negative films.

Still further, the principal-component spectral transmission density distributions (normalized by a transmittance of 100%), $e_1(\lambda)$–$e_8(\lambda)$, obtained from a plurality of film types and shown in FIGS. 12 to 14 may be stored in the ROM, and the spectral distribution may be estimated without discriminating the film type.

In the case where eight principal-component spectral transmission density distributions or principal-component spectral transmittance distributions are used, photometry is effected by spectrally diffracting the light into eight wavelength bands by means of a photometric device constituted by eight filters respectively having central wavelengths of, for instance, 440±5 nm, 480±5 nm, 520±5 nm, 560±5 nm, 600±5 nm, 640±5 nm, 680±5 nm, and 720±5 nm and half-widths of 15–50 nm, as well as a two-dimensional image sensor.

The image density of the film to be printed may be determined by using the estimated spectral distribution of the film and the spectral sensitivity distribution of the copying light-sensitive material in the following cases: in Formula (1) the spectral energy distribution $P(\lambda)$ of the light source is substantially fixed (e.g. if a xenon arc lamp is used as the light source, or the spectral energy distribution is corrected by a color filter) with respect to the wavelength; there is no substantial difference in practical use even if no consideration is given to the spectral energy distribution $P(\lambda)$ of the light source since the spectral sensitivity distribution $Sp(\lambda)$ of the copying light-sensitive material is of a narrow distribution type; and the principal-component spectral distribution of the light source of the printer is used.

The transmittance may be used instead of the transmission density, in determining the exposure amount by conducting a calculation with respect to the image on the film to be printed on the basis of the estimated spectral distribution and by using the spectral sensitivity distribution of the copying light-sensitive material. Since these two parameters are easily interchangeable, an arrangement in which the transmittance is used in the determination falls within the scope of the present invention.

In addition, an arrangement may be provided such that only eight principal-component spectral transmission density distributions or principal-component spectral transmittance distributions of a particular film type are stored, and only this particular film type among a plurality of film types is distinguished separately in advance, so as to estimate the spectral transmission density distribution or spectral transmittance distribution of the particular film type without discriminating the film type.

What is claimed is:

1. A method of estimating a spectral distribution of a color film, comprising, in sequence, the steps of:

(A) determining in advance a plurality of principal-component spectral distributions (PCSD) by analyzing spectral distributions constituted of said PCSDs for a multiplicity of color sample films, wherein each of said spectral distributions is a plural-component spectral distribution obtained from one of said sample films;

(B) measuring light transmitted through the film to be estimated by spectrally diffracting the transmitted light into wavelengths of different bands or into different wavelength bands, the number of the wavelengths or wavelength bands being at least equivalent to that of the plurality of principal-component spectral distributions PCSD, whereby said measuring provides photometric values of the respective wavelengths or wavelength bands;

(C) determining coefficients for expressing the spectral distribution of the film to be estimated as a linear sum of the plurality of principal-component spectral distributions PCSD, on the basis of the photometric values of the respective wavelengths or wavelength bands and the plurality of principal-component spectral distributions; and (D) estimating the spectral distribution of the film to be estimated, by determining the linear sum of the plurality of principal-component spectral distributions by using the coefficients obtained.

2. A method of estimating a spectral distribution of a color film, comprising, in sequence, the steps of:

(A) determining in advance three principal-component spectral transmission density distributions (PCSTDD) by analyzing spectral transmission density distributions constituted of said PCSTDDs for a multiplicity of sample color films of an identical film type, wherein each of said spectral transmission density distributions is a plural-component spectral transmission density distribution obtained from one of said sample films;

(B) measuring light transmitted through the film to be estimated of a film type identical to that of each of the sample films by spectrally diffracting the transmitted light into three or more wavelengths of different bands or into three or more different wavelength bands, whereby said measuring provides photometric values of the respective wavelengths or wavelength bands;

(C) determining coefficients for expressing the spectral transmission density distribution of the film to be estimated as a linear sum of the three principal-component spectral transmission density distributions PCSTDD, on the basis of the photometric values of the respective wavelengths or wavelength bands and the three principal-component spectral transmission density distributions; and (D) estimating the spectral transmission density distribution of the film to be estimated, by determining the linear sum of the three principal-component spectral transmission density distributions by using the coefficients obtained.

3. A method of estimating a spectral distribution of a color film, comprising, in sequence, the steps of:

(A) determining in advance three principal-component spectral transmission density distributions (PCSTDD) for each film type by analyzing spectral transmission density distributions constituted of said PCSTDDs for a multiplicity of color sample films, wherein each of said spectral transmission density distributions is a plural-component spectral transmission density distribution obtained from one of said sample films;

(B) measuring light transmitted through the film to be estimated by spectrally diffracting the transmitted light into three or more wavelengths of different bands or into three or more different wavelength bands, and determining a type of the film to be estimated, whereby said measuring provides photometric values of the respective wavelengths or wavelength bands;

(C) determining coefficients for expressing the spectral transmission density distribution of the film to be estimated as a linear sum of the three principal-component spectral transmission density distributions PCSTDD, on the basis of the photometric values of the respective wavelengths or wavelength bands and the three principal-component transmission density distributions corresponding to the discriminated type of the film to be detected; and (D) estimating the spectral transmission density distribution of the film to be estimated, by determining the linear sum of the three principal-component spectral transmission density distributions PCSTDD corresponding to the discriminated type of the film to be estimated by using the coefficients obtained.

4. A method of estimating a spectral distribution of a color film, comprising, in sequence, the steps of:

(A) determining in advance four or more principal-component spectral transmission density distributions (PCSTDD) by analyzing spectral transmission density distributions constituted of said PCSTDDs for a multiplicity of sample color films of a plurality of film types, wherein each of said spectral transmission density distributions is a plural-component spectral transmission density distribution obtained from one of said sample films;

(B) measuring light transmitted through the film to be estimated by spectrally diffracting the transmitted light into wavelengths of different bands or into different wavelength bands, the number of the wavelengths or wavelength bands being at least equivalent to that of the principal-component spectral transmission density distributions PCSTDD, whereby said measuring provides photometric values of the respective wavelengths or wavelength bands;

(C) determining coefficients for expressing the spectral transmission density distribution of the film to be estimated as a linear sum of the four or more principal-component spectral transmission density distributions PCSTDD, on the basis of the photometric values of the respective wavelengths or wavelength bands and the four or more principal-component spectral transmission density distributions PCSTDD; and (D) estimating the spectral transmission density distribution of the film to be estimated, by determining the linear sum of the four or more principal-component spectral transmission density distributions PCSTDD by using the coefficients obtained.

5. A method of estimating a spectral distribution of a film according to claim 4, wherein the number of the principal-component spectral transmission density distributions is four.

6. A method of estimating a spectral distribution of a color film, comprising, in sequence, the steps of:

(A) determining in advance four or more principal-component spectral transmittance distributions (PCSTD) by analyzing spectral transmittance distributions constituted of said PCSTDs for a multiplicity of sample color films of a plurality of film types, wherein each of said spectral transmittance distributions is a plural-component spectral transmittance distribution obtained from one of said sample films;

(B) measuring light transmitted through the film to be estimated by spectrally diffracting the transmitted light into wavelengths of different bands or into different wavelength bands, the number of the wavelengths or wavelength bands being at least equivalent to that of the principal-component spectral transmittance distributions PCSTD, whereby said measuring provides photometric values of the respective wavelengths or wavelength bands;

(C) determining coefficients for expressing the spectral transmittance distribution of the film to be estimated as a linear sum of the four or more principal-component spectral transmittance distributions PCSTD, on the basis of the photometric values of the respective wavelengths or wavelength bands and the four or more principal-component spectral transmittance distributions PCSTD; and (D) estimating the spectral transmittance distribution of the film to be estimated, by determining the linear sum of the four or more principal-component spectral transmittance distributions PCSTD by using; the coefficients obtained.

7. A method of estimating a spectral distribution of a film according to claim 6, wherein four or five principal-component spectral transmittance distributions are obtained by analyzing spectral transmission density distributions of the multiplicity of sample films of an identical film type.

8. A method of estimating a spectral distribution of a film according to claim 6, wherein four or five principal-component spectral transmittance distributions are obtained for each of the film types by analyzing spectral transmission density distributions of the multiplicity of sample films, and the coefficients are determined on the basis of the measured values and the principal-component spectral transmittance distribution corresponding to the discriminated type of the film to be estimated.

9. A method of estimating a spectral distribution of a film according to claim 6, wherein the number of the principal-component transmittance distributions is eight.

10. A method of determining exposure amount, comprising, in sequence, the steps of:

(A) determining in advance a plurality of principal-component spectral distributions (PCSD) by analyzing spectral distributions constituted of said PCSDs for a multiplicity of color sample films, wherein each of said spectral distributions is a plural-component spectral distribution obtained from one of said sample films;

(B) measuring light transmitted through a film to be estimated by spectrally diffracting the transmitted light into wavelengths of different bands or into different wavelength bands, the number of the wavelengths or wavelength bands being at least equivalent to that of the plurality of principal-component spectral distributions PCSD, whereby said measuring provides photometric values of the respective wavelengths or wavelength bands;

(C) determining coefficients for expressing the spectral distribution of the film to be estimated as a linear sum of the plurality of principal-component spectral distributions PCSD, on the basis of the photometric values of the respective wavelengths or wavelength bands and the plurality of principal-component spectral distributions PCSD;

(D) estimating the spectral distribution of the film to be estimated, by determining the linear sum of the plurality of principal-component spectral distributions PCSD by using the coefficients obtained;

(E) calculating a transmission density which is equivalent to a transmission density obtained when an image on the film to be printed is photometrically measured by a photometric device having a spectral sensitivity distribution identical to an effective spectral sensitivity distribution of a copying light-sensitive material, on the basis of the spectral distribution estimated and by using a spectral sensitivity distribution of the copying light-sensitive material; and (F) determining exposure amount for printing the image on the film to be printed onto the light-sensitive material, on the basis of the transmission density calculated.

11. A method of determining exposure amount, comprising, in sequence, the steps of:

(A) determining in advance three principal-component spectral transmission density distributions (PCSTDD) by analyzing spectral transmission density distributions constituted of said PCSTDDs for a multiplicity of color sample films of an identical film type, wherein each of said spectral transmission density distributions is a plural-component spectral transmission density distribution obtained from one of said sample films;

(B) measuring light transmitted through a film to be estimated of a film type identical to that of each of the sample films by spectrally diffracting the transmitted light into three or more wavelengths of different bands or into three or more different wavelength bands, whereby said measuring provides photometric values of the respective wavelengths or wavelength bands;

(C) determining coefficients for expressing the spectral transmission density distribution of the film to be estimated as a linear sum of the three principal-component spectral transmission density distributions PCSTDD, on the basis of the photometric values of the respective wavelengths or wavelength bands and the three principal-component spectral transmission density distributions PCSTDD;

(D) estimating the spectral transmission density distribution of the film to be estimated, by determining the linear sum of the three principal-component spectral transmission density distributions PCSTDD by using the coefficients obtained;

(E) calculating a transmission density which is equivalent to a transmission density obtained when an image on the film to be printed is photometrically measured by a photometric device having a spectral sensitivity distribution identical to a spectral sensitivity distribution of a copying light-sensitive material, on the basis of the spectral transmission density distribution estimated, the spectral energy distribution of light to be made incident upon the film, and the spectral sensitivity distribution of the copying light-sensitive material; and (F) determining exposure amount for printing the image on the film to be printed onto the copying light-sensitive material, on the basis of the transmission density calculated.

12. A method of determining exposure amount, comprising, in sequence, the steps of:

(A) determining in advance three principal-component spectral transmission density distributions (PCSTDD) for each film type by analyzing spectral transmission density distributions constituted of said PCSTDDs for a multiplicity of color sample films, wherein each of said spectral transmission density distributions is a plural-component spectral transmission density distribution obtained from one of said sample films;

(B) measuring light transmitted through a film to be estimated by spectrally diffracting the transmitted light into three or more wavelengths of different bands or into three or more different wavelength bands, and determining a type of the film to be estimated, whereby said measuring provides photometric values of the respective wavelengths or wavelength bands;

(C) determining coefficients for expressing the spectral transmission density distribution of the film to be estimated as a linear sum of the three principal-component spectral transmission density distributions PCSTDD, on the basis of the photometric values of the respective wavelengths or wavelength bands and the three principal-component transmission density distributions PCSTDD corresponding to the discriminated type of the film to be detected;

(D) estimating the spectral transmission density distribution of the film to be estimated, by determining the linear sum of the three principal-component spectral transmission density distributions PCSTDD corresponding to the discriminated type of the film to be estimated by using the coefficients obtained;

(E) calculating a transmission density which is equivalent to a transmission density obtained when an image on the film to be printed is photometrically measured by a photometric device having a spectral sensitivity distribution identical to a spectral sensitivity distribution of a copying light-sensitive material, on the basis of the spectral transmission density distribution estimated, the spectral energy distribution of light to be made incident upon the film, and the spectral sensitivity distribution of the copying light-sensitive material; and (F) determining exposure amount for printing the image on the film to be printed onto the copying light-sensitive material, on the basis of the transmission density calculated.

13. A method of determining exposure amount, comprising, in sequence, the steps of:

(A) determining in advance four or more principal-component spectral transmission density distributions (PCSTDD) by analyzing spectral transmission density distributions constituted of said PCSTDDs for a multiplicity of color sample films of a plurality of film types, wherein each of said spectral transmission density distributions is a plural-component spectral transmission density distribution obtained from one of said sample films;

(B) measuring light transmitted through a film to be estimated by spectrally diffracting the transmitted light into wavelengths of different bands or into different wavelength bands, the number of the wavelengths or wavelength bands being at least equivalent to that of the principal-component spectral transmission density distributions PCSTDD, whereby said measuring provides photometric values of the respective wavelengths or wavelength bands;

(C) determining coefficients for expressing the spectral transmission density distribution of the film to be estimated as a linear sum of the four or more principal-component spectral transmission density distributions PCSTDD, on the basis of the photometric values of the respective wavelengths or wavelength bands and the four or more principal-component spectral transmission density distributions PCSTDD;

(D) estimating the spectral transmission density distribution of the film to be estimated, by determining the linear sum of the four or more principal-component spectral transmission density distributions PCSTDD by using the coefficients obtained;

(E) calculating a transmission density which is equivalent to a transmission density obtained when an image on the film to be printed is photometrically measured by a photometric device having a spectral sensitivity distribution identical to a spectral sensitivity distribution of a copying light-sensitive material, on the basis of the spectral transmission density distribution estimated, the spectral energy distribution of light to be made incident upon the film, and the spectral sensitivity distribution of the copying light-sensitive material; and (F) determining exposure amount for printing the image on the film to be printed onto the copying light-sensitive material, on the basis of the transmission density calculated.

14. A method of determining exposure amount according to claim 13, wherein the number of the principal-component spectral transmission density distributions is four.

15. A method of determining exposure amount according to claim 13, wherein four or five principal-component spectral transmittance distributions are obtained by analyzing spectral transmission density distributions of the multiplicity of sample films of an identical film type.

16. A method of determining exposure amount according to claim 13, wherein four or five principal-component spectral transmittance distributions are obtained for each of the film types by analyzing spectral transmission density distributions of the multiplicity of sample films, and the coefficients are determined on the basis of the measured values and the principal-component spectral transmittance distribution corresponding to the discriminated type of the film to be estimated.

17. A method of determining exposure amount according to claim 13, wherein the number of the principal-component transmittance distributions is eight.

18. A method of determining exposure amount, comprising, in sequence, the steps of:

(A) determining in advance four or more principal-component spectral transmittance distributions (PCSTD) by analyzing spectral transmittance distributions constituted of said PCSTDs for a multiplicity of color sample films of a plurality of film types, wherein each of said spectral transmittance distributions is a plural-component spectral transmittance distribution obtained from one of said sample films;

(B) measuring light transmitted through a film to be estimated by spectrally diffracting the transmitted light into wavelengths of different bands or into different wavelength bands, the number of the wavelengths or wavelength bands being at least equivalent to that of the principal-component spectral transmittance distributions PCSTD, whereby said measuring provides photometric values of the respective wavelengths or wavelength bands;

(C) determining coefficients for expressing the spectral transmittance distribution of the film to be estimated as a linear sum of the four or more principal-component spectral transmittance distributions, on the basis of the photometric values of the respective wavelengths or wavelength bands and the four or more principal-component spectral transmittance distributions PCSTD;

(D) estimating the spectral transmittance distribution of the film to be estimated, by determining the linear sum of the four or more principal-component spectral transmittance distributions PCSTD by using the coefficients obtained;

(E) calculating a transmission density which is equivalent to a transmission density obtained when an image on the film to be printed is photometrically measured by a photometric device having a spectral sensitivity distribution identical to a spectral sensitivity distribution of a copying light-sensitive material, on the basis of the spectral transmittance distribution estimated, the spectral energy distribution of light to be made incident upon the film, and the spectral sensitivity distribution of the copying light-sensitive material; and (F) determining exposure amount for printing the image on the film to be printed onto the copying light-sensitive material, on the basis of the transmission density calculated.

* * * * *